(12) United States Patent
Sugahara et al.

(10) Patent No.: US 11,115,181 B2
(45) Date of Patent: Sep. 7, 2021

(54) MEMORY DEVICE, HOST DEVICE, AND MEMORY SYSTEM

(71) Applicant: MegaChips Corporation, Osaka (JP)

(72) Inventors: Takahiko Sugahara, Osaka (JP); Hiromu Yutani, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 16/799,836

(22) Filed: Feb. 25, 2020

(65) Prior Publication Data

US 2020/0195418 A1    Jun. 18, 2020

Related U.S. Application Data

(63) Continuation of application No. 15/213,918, filed on Jul. 19, 2016, now Pat. No. 10,615,959.

(30) Foreign Application Priority Data

Jul. 22, 2015  (JP) ................................ 2015-145323
Jul. 22, 2015  (JP) ................................ 2015-145324

(51) Int. Cl.
*H04L 9/00*     (2006.01)
*G06F 21/60*    (2013.01)
*G06F 21/85*    (2013.01)
*H04L 9/06*     (2006.01)
(Continued)

(52) U.S. Cl.
CPC ............ *H04L 9/003* (2013.01); *G06F 21/606* (2013.01); *G06F 21/79* (2013.01); *G06F 21/85* (2013.01); *G09C 1/00* (2013.01); *H04L 9/0656* (2013.01); *G06F 2221/2123* (2013.01); *H04L 2209/08* (2013.01)

(58) Field of Classification Search
CPC ..... G06F 21/60–606; G06F 21/70–755; G06F 2221/2123; H04L 9/002–005; H04L 2209/08
See application file for complete search history.

(56) References Cited

U.S. PATENT DOCUMENTS 7,500,112 B1    3/2009  Wille et al.
9,735,953 B2    8/2017  Benoit et al.
9,774,614 B2    9/2017  Patne et al.
(Continued)

FOREIGN PATENT DOCUMENTS

JP    2002-526797    8/2002
JP    2003-018143    1/2003
(Continued)

OTHER PUBLICATIONS

Foreign Office Action issued in Japanese Application No. 2015-145324, dated Aug. 24, 2018.
(Continued)

*Primary Examiner* — Daniel B Potratz
*Assistant Examiner* — D'Arcy Winston Straub
(74) *Attorney, Agent, or Firm* — Xsensus LLP

(57) ABSTRACT

A control circuit causes a first cryptographic module to perform a dummy operation in a command processing period and a data processing period in which a second cryptographic module performs a normal operation while the first cryptographic module does not perform a normal operation.

14 Claims, 11 Drawing Sheets

(51) Int. Cl.
*G09C 1/00* (2006.01)
*G06F 21/79* (2013.01)

(56) References Cited

U.S. PATENT DOCUMENTS

| | | | |
|---|---|---|---|
| 9,961,057 B2 | 5/2018 | Medwed et al. | |
| 2004/0059908 A1* | 3/2004 | Yamada | H04L 9/003 |
| | | | 713/151 |
| 2007/0075732 A1 | 4/2007 | Fruhauf et al. | |
| 2008/0240443 A1 | 10/2008 | Vuillaume et al. | |
| 2011/0296198 A1* | 12/2011 | Motoyama | G06F 21/602 |
| | | | 713/189 |
| 2016/0352508 A1* | 12/2016 | Guillen-Hernandez | |
| | | | H04L 9/003 |
| 2017/0085368 A1* | 3/2017 | Saab | H04L 9/003 |

FOREIGN PATENT DOCUMENTS

| | | |
|---|---|---|
| JP | 2003-204322 | 7/2003 |
| JP | 2004-516706 | 6/2004 |
| JP | 2006-081059 | 3/2006 |
| JP | 2013-143653 | 7/2013 |
| JP | 2014-224879 | 12/2014 |
| JP | 2015-026892 | 2/2015 |
| JP | 2015-095841 | 5/2015 |

OTHER PUBLICATIONS

Foreign Office Action issued in Japanese Application No. 2015-145323, dated Aug. 24, 2018.
Paul Kocher et al. "Introduction to Differential Power Analysis and Related Attacks," http://www.cryptography.com/, 1998, 5 Pages.
Daisuke Suzuki et al. "Random Switching Logic: A Countermeasure against DPA based on Transition Probability," IACR Eprint archive, 2004, 16 Pages.
Paul Kocher et al. "Differential Power Analysis," Cryptography Research, Inc., http://www.cryptography.com, Dec. 1999, 10 Pages.

* cited by examiner

MEMORY DEVICE, HOST DEVICE, AND MEMORY SYSTEM

CROSS REFERENCE TO RELATED APPLICATIONS

The present application is a continuation of U.S. application Ser. No. 15/213,918, filed Jul. 19, 2016, which is based on, and claims priority from Japanese Patent Application Serial Nos. 2015-145323, and 2015-145324, both filed Jul. 22, 2015, the disclosure of each is hereby incorporated by reference herein in its entirety.

BACKGROUND

Technical Field

The present disclosure relates to a memory device, a host device, and a memory system including the same.

Related Art

Among memory systems including a host device and a memory device connected thereto, memory systems with improved security by encrypting commands and data transmitted/received between the two devices are in actual use.

Cryptosystems currently in use are perceived to be computationally secure against cryptanalysis. Actually implementing a cryptographic module in a memory system, however, may result in leaks caused by, for example, power consumption and processing time. Threats of side channel attacks are increasing, in an attempt to illicitly obtain secret information such as secret keys by observing these operational conditions by various physical means.

Examples of side channel attacks include power analysis attacks which are conducted to analyze secret information by studying the power consumption of a device. There is a report that Differential Power Analysis (DPA), which is an analysis of power consumption measurements by statistical functions, is one of the most powerful attacks among such side channel attacks (see Paul Kocher et al., "Introduction to Differential Power Analysis and related Attacks," [online] Cryptography Research, searched in the Internet on Jul. 1, 2015, www.cryptography.com/public/pdf/DPATechInfo.pdf.

Various circuits are proposed as a countermeasure against the DPA attack. For example, Daisuke Suzuki et al. "Random Switching Logic: A Countermeasure against DPA based on Transition Probability," [online], International Association for Cryptologic Research, searched in the Internet on Jul. 1, 2015, eprint.iacr.org/2004/346.pdf propose Random Switching Logic (RSL) circuit and Wave Dynamic Differential Logic (WDDL) circuit. The RSL circuit switches an operational mode of a logic circuit with a random number, so as to eliminate a biased state transition probability, thereby randomizing power consumption to prevent estimation of a cryptographic key. The WDDL circuit reduces a difference in current consumption due to difference in bit values in an arithmetic operation with a complementary circuit after precharging, so as to render the power consumption uniform.

SUMMARY

A memory device configured to be connected to a host device includes a first cryptographic module and a second cryptographic module configured to perform a normal operation to encrypt and decrypt data to be transmitted and received between the host device and the memory device, and a control circuit configured to control an operation of the first cryptographic module and the second cryptographic module. The control circuit is configured to cause the first cryptographic module to perform a dummy operation in a first period in which the second cryptographic module performs a normal operation while the first cryptographic module does not perform a normal operation.

A host device configured to accept a memory device includes a first cryptographic module and a second cryptographic module configured to perform a normal operation to encrypt and decrypt data to be transmitted and received between the host device and the memory device, and a control circuit configured to control an operation of the first cryptographic module and the second cryptographic module. The control circuit is configured to cause the first cryptographic module to perform a dummy operation in a first period in which the second cryptographic module performs a normal operation while the first cryptographic module does not perform a normal operation.

A memory system includes a host device and a memory device configured to be connected to the host device. The host device includes a first cryptographic module and a second cryptographic module configured to perform a normal operation to encrypt and decrypt data to be transmitted and received between the host device and the memory device, and a first control circuit configured to control an operation of the first cryptographic module and the second cryptographic module. The first control circuit is configured to cause the first cryptographic module to perform a dummy operation in a first period in which the second cryptographic module performs a normal operation while the first cryptographic module does not perform a normal operation. The memory device includes a third cryptographic module and a fourth cryptographic module configured to perform a normal operation to encrypt and decrypt data to be transmitted and received between the host device and the memory device, and a second control circuit configured to control an operation of the third cryptographic module and the fourth cryptographic module. The second control circuit is configured to cause the third cryptographic module to perform a dummy operation in a second period in which the fourth cryptographic module performs a normal operation while the third cryptographic module does not perform a normal operation.

DETAILED DESCRIPTION

Figure 1:
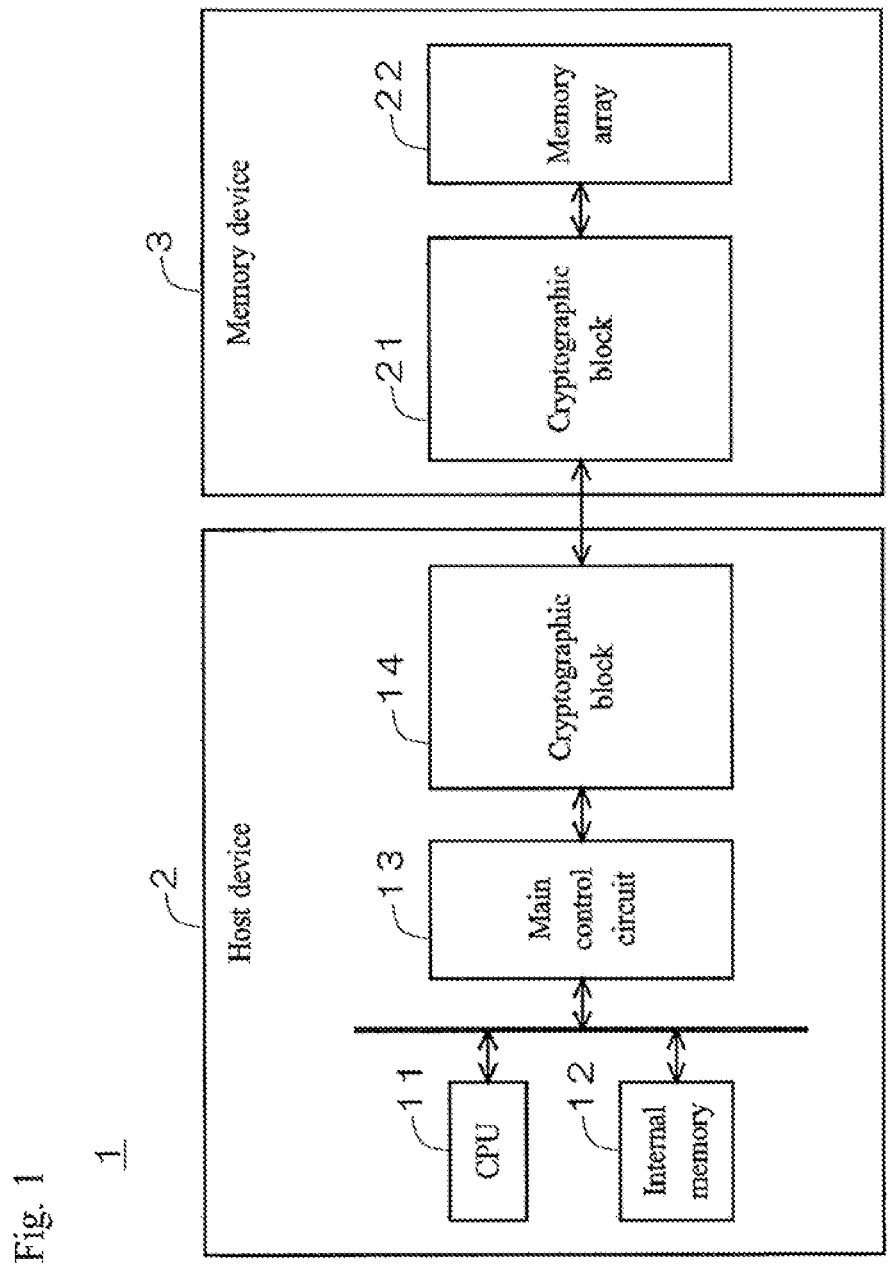
FIG. 1 is a diagram illustrating a configuration of a memory system according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

Providing a memory system including a host device and a memory device with the above-described RSL and WDDL circuits increases arithmetic operation time, circuit size, and power consumption by two to three times, in comparison with not implementing these circuits, which results in increase in cost.

The present disclosure is directed to obtaining a memory device, a host device, and a memory system including the same that implement a countermeasure against the DPA attack at a low cost.

A memory device according to an aspect of the present disclosure is configured to be connected to a host device. The memory device includes a first cryptographic module and a second cryptographic module configured to perform a normal operation to encrypt and decrypt data to be transmitted and received between the host device and the memory device, and a control circuit configured to control an operation of the first cryptographic module and the second cryptographic module, the control circuit being configured to cause the first cryptographic module to perform a dummy operation in a first period in which the second cryptographic module performs a normal operation while the first cryptographic module does not perform a normal operation.

In the memory device according to this aspect, the control circuit causes the first cryptographic module to perform a dummy operation in a first period in which the second cryptographic module performs a normal operation while the first cryptographic module does not perform a normal operation. The power consumption characteristic of the second cryptographic module is effectively hidden by causing the first cryptographic module to perform a dummy operation in the first period in which only the second cryptographic module performs a normal operation. In consequence, a countermeasure against the DPA attack is implemented at a low cost.

In some embodiments, the control circuit is configured to cause both of the first cryptographic module and the second cryptographic module to perform a normal operation concurrently in a second period different from the first period.

According to such embodiments, the control circuit causes both of the first cryptographic module and the second cryptographic module to perform a normal operation concurrently. The power consumption characteristic which would be revealed if only either one of the first cryptographic module and the second cryptographic module performs a normal operation is effectively hidden by causing the both modules to perform a normal operation concurrently. In consequence, a countermeasure against the DPA attack is implemented at a low cost.

In some embodiments, the first cryptographic module includes a temporary data generation circuit configured to generate temporary data based on input data. The second cryptographic module includes an encryption circuit configured to perform encryption based on the temporary data generated by the temporary data generation circuit. The control circuit is configured to input dummy input data to the temporary data generation circuit in the first period.

According to such embodiments, the control circuit inputs dummy input data to the temporary data generation circuit in the first period. Inputting the dummy input data to the temporary data generation circuit effectively causes the temporary data generation circuit to perform a dummy operation to generate dummy temporary data.

In some embodiments, the dummy input data has a fixed value.

According to such embodiments, the dummy input data has a fixed value. Fixing the value of the dummy input data on purpose to lead an attacker to anticipate some sort of key data generation offers a possibility that the attacker conducts a useless work of identifying the dummy input data by an analysis. In consequence, genuine input data is protected for an extended period. Moreover, fixing the value of the dummy input data achieves uniform power consumption of the temporary data generation circuit due to a dummy operation.

In some embodiments, the dummy input data has a variable value.

According to such embodiments, the dummy input data has a variable value. Since the power consumption by the temporary data generation circuit is varied every time the dummy input data is varied, the power consumption of the memory device is effectively varied as a whole. In consequence, the power consumption characteristic analysis by the DPA attack becomes more difficult.

In some embodiments, the control circuit includes a storage circuit configured to store state transition information of the temporary data generation circuit. The control circuit is configured to save latest state transition information in the storage circuit in causing the first cryptographic module to perform a dummy operation, and write back the state transition information stored in the storage circuit to the temporary data generation circuit in subsequently causing the temporary data generation circuit to perform a normal operation.

According to such embodiments, the control circuit saves the latest state transition information of the temporary data generation circuit in the storage circuit in causing the first cryptographic module to perform a dummy operation, and writes back the state transition information stored in the storage circuit to the temporary data generation circuit in subsequently causing the temporary data generation circuit to perform a normal operation. This achieves consistent generation of the temporary data by the temporary data generation circuit in a normal operation after a dummy operation.

In some embodiments, the input data is key information.

According to such embodiments, inputting key information as input data enables the temporary data generation circuit to generate a session key as temporary data.

In some embodiments, the memory device further includes an unauthorized access detection circuit configured to detect an unauthorized access from the host device. The control circuit is configured to cause the second cryptographic module to perform a dummy operation in the first period if the unauthorized access detection circuit detects an unauthorized access.

According to such embodiments, the control circuit causes the second cryptographic module to perform a dummy operation in the first period if the unauthorized access detection circuit detects an unauthorized access. The availability of the system is therefore ensured, while power consumption that would be unnecessarily increased if a dummy operation is performed without an unauthorized access is prevented.

A host device according to an aspect of the present disclosure is configured to accept a memory device. The host device includes a first cryptographic module and a second cryptographic module configured to perform a normal operation to encrypt and decrypt data to be transmitted and received between the host device and the memory device, and a control circuit configured to control an operation of the first cryptographic module and the second cryptographic module, the control circuit being configured to cause the first cryptographic module to perform a dummy operation in a first period in which the second cryptographic module performs a normal operation while the first cryptographic module does not perform a normal operation.

In the host device according to this aspect, the control circuit causes the first cryptographic module to perform a dummy operation in a first period in which the second cryptographic module performs a normal operation while the first cryptographic module does not perform a normal operation. The power consumption characteristic of the second cryptographic module is effectively hidden by causing the first cryptographic module to perform a dummy operation in the first period in which only the second cryptographic module performs a normal operation. In consequence, a countermeasure against the DPA attack is implemented at a low cost.

In some embodiments, the control circuit is configured to cause both of the first cryptographic module and the second cryptographic module to perform a normal operation concurrently in a second period different from the first period.

According to such embodiments, the control circuit causes both of the first cryptographic module and the second cryptographic module to perform a normal operation concurrently. The power consumption characteristic which would be revealed if only either one of the first cryptographic module and the second cryptographic module performs a normal operation is effectively hidden by causing the both modules to perform a normal operation concurrently. In consequence, a countermeasure against the DPA attack is implemented at a low cost.

In some embodiments, the first cryptographic module includes a temporary data generation circuit configured to generate temporary data based on input data. The second cryptographic module includes an encryption circuit configured to perform encryption based on the temporary data generated by the temporary data generation circuit. The control circuit is configured to input dummy input data to the temporary data generation circuit in the first period.

According to such embodiments, the control circuit inputs dummy input data to the temporary data generation circuit in the first period. Inputting the dummy input data to the temporary data generation circuit effectively causes the temporary data generation circuit to perform a dummy operation to generate dummy temporary data.

In some embodiments, the dummy input data has a fixed value.

According to such embodiments, the dummy input data has a fixed value. Fixing the value of the dummy input data on purpose to lead an attacker to anticipate some sort of key data generation offers a possibility that the attacker conducts a useless work of identifying the dummy input data by an analysis. In consequence, genuine input data is protected for an extended period. Moreover, fixing the value of the dummy input data achieves uniform power consumption of the temporary data generation circuit due to a dummy operation.

In some embodiments, the dummy input data has a variable value.

According to such embodiments, the dummy input data has a variable value. Since the power consumption by the temporary data generation circuit is varied every time the dummy input data is varied, the power consumption of the host device is effectively varied as a whole. In consequence, the power consumption characteristic analysis by the DPA attack becomes more difficult.

In some embodiments, the control circuit includes a storage circuit configured to store state transition information of the temporary data generation circuit. The control circuit is configured to save latest state transition information in the storage circuit in causing the first cryptographic module to perform a dummy operation, and write back the state transition information stored in the storage circuit to the temporary data generation circuit in subsequently causing the temporary data generation circuit to perform a normal operation.

According to such embodiments, the control circuit saves the latest state transition information of the temporary data generation circuit in the storage circuit in causing the first cryptographic module to perform a dummy operation, and writes back the state transition information stored in the storage circuit to the temporary data generation circuit in subsequently causing the temporary data generation circuit to perform a normal operation. This achieves consistent generation of the temporary data by the temporary data generation circuit in a normal operation after a dummy operation.

In some embodiments, the input data is key information.

According to such embodiments, inputting key information as input data enables the temporary data generation circuit to generate a session key as temporary data.

A memory system according to an aspect of the present disclosure includes a host device and a memory device configured to be connected to the host device. The host device includes a first cryptographic module and a second cryptographic module configured to perform a normal operation to encrypt and decrypt data to be transmitted and received between the host device and the memory device, and a first control circuit configured to control an operation of the first cryptographic module and the second cryptographic module, the first control circuit being configured to cause the first cryptographic module to perform a dummy operation in a first period in which the second cryptographic module performs a normal operation while the first cryptographic module does not perform a normal operation. The memory device includes a third cryptographic module and a fourth cryptographic module configured to perform a normal operation to encrypt and decrypt data to be transmitted and received between the host device and the memory device, and a second control circuit configured to control an operation of the third cryptographic module and the fourth cryptographic module, the second control circuit being configured to cause the third cryptographic module to perform a dummy operation in a second period in which the fourth cryptographic module performs a normal operation while the third cryptographic module does not perform a normal operation.

In the memory system according to this aspect, a countermeasure against the DPA attack is implemented in both of the memory device and the host device, which enhances the resistance against the DPA attack of the memory system as a whole.

A memory device according to an aspect of the present disclosure is configured to be connected to a host device. The memory device includes a first cryptographic module and a second cryptographic module configured to perform a normal operation to encrypt and decrypt data to be transmitted and received between the host device and the memory device, a third cryptographic module configured to perform a dummy operation based on dummy key information, and a control circuit configured to control an operation of the third cryptographic module, the control circuit being configured to cause the third cryptographic module to perform a dummy operation in a period in which one of the first cryptographic module and the second cryptographic module performs a normal operation.

In the memory device according to this aspect, the control circuit causes the third cryptographic module to perform a dummy operation in a period in which one of the first cryptographic module and the second cryptographic module performs a normal operation. The power consumption characteristic of the first or the second cryptographic module which performs a normal operation is effectively hidden by causing the third cryptographic module to perform a dummy operation. In consequence, a countermeasure against the DPA attack is implemented at a low cost.

In some embodiments, the control circuit is further configured to cause the first cryptographic module to perform a dummy operation in a period in which the second cryptographic module performs a normal operation while the first cryptographic module does not perform a normal operation.

According to such embodiments, the control circuit causes the first cryptographic module to perform a dummy operation in a period in which the second cryptographic module performs a normal operation while the first cryptographic module does not perform a normal operation. The power consumption characteristic of the second cryptographic module is effectively hidden by causing the first cryptographic module to perform a dummy operation in the period in which only the second cryptographic module performs a normal operation.

In some embodiments, the control circuit is further configured to cause the third cryptographic module to perform a dummy operation in a period in which both of the first cryptographic module and the second cryptographic module perform a normal operation concurrently.

According to such embodiments, the control circuit causes the third cryptographic module to perform a dummy operation in a period in which both of the first cryptographic module and the second cryptographic module perform a normal operation concurrently. The power consumption characteristic of the first cryptographic module and the second cryptographic module is effectively hidden by causing the third cryptographic module to perform a dummy operation in the period in which both of the first cryptographic module and the second cryptographic module perform a normal operation concurrently.

In some embodiments, the first cryptographic module includes a first temporary data generation circuit configured to generate temporary data based on input data. The second cryptographic module includes a first encryption circuit configured to perform encryption based on the temporary data generated by the first temporary data generation circuit. The third cryptographic module includes a second temporary data generation circuit configured to generate temporary data based on dummy input data and a second encryption circuit configured to perform encryption based on the temporary data generated by the second temporary data generation circuit. The control circuit is configured to cause the second encryption circuit to perform a dummy operation in a period in which only the first temporary data generation circuit of the first temporary data generation circuit and the first encryption circuit performs a normal operation, while causing the second temporary data generation circuit to perform a dummy operation in a period in which only the first encryption circuit of the first temporary data generation circuit and the first encryption circuit performs a normal operation.

According to such embodiments, the control circuit causes the second encryption circuit to perform a dummy operation in a period in which only the first temporary data generation circuit performs a normal operation, while causing the second temporary data generation circuit to perform a dummy operation in a period in which only the first encryption circuit performs a normal operation. The power consumption of the memory device as a whole is thereby uniformed, and thus the power consumption characteristic analysis by the DPA attack becomes more difficult.

In some embodiments, the dummy input data has a fixed value.

According to such embodiments, the dummy input data has a fixed value. Fixing the value of the dummy input data on purpose to lead an attacker to anticipate some sort of key data generation offers a possibility that the attacker conducts a useless work of identifying the dummy input data by an analysis. In consequence, genuine input data is protected for an extended period. Moreover, fixing the value of the dummy input data achieves uniform power consumption of the third cryptographic module due to a dummy operation.

In some embodiments, the dummy input data has a variable value.

According to such embodiments, the dummy input data has a variable value. Since the power consumption by the third cryptographic module is varied every time the dummy input data is varied, the power consumption of the memory device is effectively varied as a whole. In consequence, the power consumption characteristic analysis by the DPA attack becomes more difficult.

In some embodiments, the input data is key information.

According to such embodiments, inputting key information as input data enables the first temporary data generation circuit to generate a session key as temporary data.

In some embodiments, the memory device further includes an unauthorized access detection circuit configured to detect an unauthorized access from the host device. The control circuit is configured to cause the third cryptographic module to perform a dummy operation if the unauthorized access detection circuit detects an unauthorized access.

According to such embodiments, the control circuit causes the third cryptographic module to perform a dummy operation if the unauthorized access detection circuit detects an unauthorized access. The availability of the system is therefore ensured, while power consumption that would be unnecessarily increased if a dummy operation is performed without an unauthorized access is prevented.

A host device according to an aspect of the present disclosure is configured to accept a memory device. The host device includes a first cryptographic module and a second cryptographic module configured to perform a normal operation to encrypt and decrypt data to be transmitted and received between the host device and the memory device, a third cryptographic module configured to perform a dummy operation based on dummy key information, and a control circuit configured to control an operation of the third cryptographic module, the control circuit being configured to cause the third cryptographic module to perform a dummy operation in a period in which one of the first cryptographic module and the second cryptographic module performs a normal operation.

In the host device according to this aspect, the control circuit causes the third cryptographic module to perform a dummy operation in a period in which one of the first cryptographic module and the second cryptographic module performs a normal operation. The power consumption characteristic of the first or the second cryptographic module which performs a normal operation is effectively hidden by causing the third cryptographic module to perform a dummy operation. In consequence, a countermeasure against the DPA attack is implemented at a low cost.

In some embodiments, the control circuit is further configured to cause the first cryptographic module to perform a dummy operation in a period in which the second cryptographic module performs a normal operation while the first cryptographic module does not perform a normal operation.

According to such embodiments, the control circuit causes the first cryptographic module to perform a dummy operation in a period in which the second cryptographic module performs a normal operation while the first cryptographic module does not perform a normal operation. The power consumption characteristic of the second cryptographic module is effectively hidden by causing the first cryptographic module to perform a dummy operation in the period in which only the second cryptographic module performs a normal operation.

In some embodiments, the control circuit is further configured to cause the third cryptographic module to perform a dummy operation in a period in which both of the first cryptographic module and the second cryptographic module perform a normal operation concurrently.

According to such embodiments, the control circuit causes the third cryptographic module to perform a dummy operation in a period in which both of the first cryptographic module and the second cryptographic module perform a normal operation concurrently. The power consumption characteristic of the first cryptographic module and the second cryptographic module is effectively hidden by causing the third cryptographic module to perform a dummy operation in the period in which both of the first cryptographic module and the second cryptographic module perform a normal operation concurrently.

In some embodiments, the first cryptographic module includes a first temporary data generation circuit configured to generate temporary data based on input data. The second cryptographic module includes a first encryption circuit configured to perform encryption based on the temporary data generated by the first temporary data generation circuit. The third cryptographic module includes a second temporary data generation circuit configured to generate temporary data based on dummy input data and a second encryption circuit configured to perform encryption based on the temporary data generated by the second temporary data generation circuit. The control circuit is configured to cause the second encryption circuit to perform a dummy operation in a period in which only the first temporary data generation circuit of the first temporary data generation circuit and the first encryption circuit performs a normal operation, while causing the second temporary data generation circuit to perform a dummy operation in a period in which only the first encryption circuit of the first temporary data generation circuit and the first encryption circuit performs a normal operation.

According to such embodiments, the control circuit causes the second encryption circuit to perform a dummy operation in a period in which only the first temporary data generation circuit performs a normal operation, while causing the second temporary data generation circuit to perform a dummy operation in a period in which only the first encryption circuit performs a normal operation. The power consumption of the memory device as a whole is thereby uniformed, and thus the power consumption characteristic analysis by the DPA attack becomes more difficult.

In some embodiments, the dummy input data has a fixed value.

According to such embodiments, the dummy input data has a fixed value. Fixing the value of the dummy input data on purpose to lead an attacker to anticipate some sort of key data generation offers a possibility that the attacker conducts a useless work of identifying the dummy input data by an analysis. In consequence, genuine input data is protected for an extended period. Moreover, fixing the value of the dummy input data achieves uniform power consumption of the third cryptographic module due to a dummy operation.

In some embodiments, the dummy input data has a variable value.

According to such embodiments, the dummy input data has a variable value. Since the power consumption by the third cryptographic module is varied every time the dummy input data is varied, the power consumption of the host device is effectively varied as a whole. In consequence, the power consumption characteristic analysis by the DPA attack becomes more difficult.

In some embodiments, the input data is key information.

According to such embodiments, inputting key information as input data enables the first temporary data generation circuit to generate a session key as temporary data.

A memory system according to an aspect of the present disclosure includes a host device and a memory device configured to be connected to the host device. The host device includes a first cryptographic module and a second cryptographic module configured to perform a normal operation to encrypt and decrypt data to be transmitted and received between the host device and the memory device, a third cryptographic module configured to perform a dummy operation based on dummy key information, and a first control circuit configured to control an operation of the third cryptographic module, the first control circuit being configured to cause the third cryptographic module to perform a dummy operation in a period in which one of the first cryptographic module and the second cryptographic module performs a normal operation. The memory device includes a fourth cryptographic module and a fifth cryptographic module configured to perform a normal operation to encrypt and decrypt data to be transmitted and received between the host device and the memory device, a sixth cryptographic module configured to perform a dummy operation based on dummy key information, and a second control circuit configured to control an operation of the sixth cryptographic module, the second control circuit being configured to cause the sixth cryptographic module to perform a dummy operation in a period in which one of the fourth cryptographic module and the fifth cryptographic module performs a normal operation.

In the memory system according to this aspect, a countermeasure against the DPA attack is implemented in both of the memory device and the host device, which enhances the resistance against the DPA attack of the memory system as a whole.

According to some embodiments of the present disclosure, a countermeasure against the DPA attack is implemented at a low cost.

These and other objects, features, aspects and advantages of the present disclosure will become more apparent from the following detailed description when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

FIG. 1 is a simplified diagram illustrating a configuration of a memory system 1 according to the present disclosure. As illustrated in FIG. 1 the memory system 1 includes a host device 2, and a memory device 3, such as a semiconductor memory, detachably connected to the host device 2.

The host device 2 includes a CPU 11, an internal memory 12, a main control circuit 13, and a cryptographic block 14. The memory device 3 includes a cryptographic block 21 similar to the cryptographic block 14, and a memory array 22 for storing arbitrary data such as content data. The cryptographic blocks 14 and 21 perform encryption and decryption on commands or data transmitted/received between the host device 2 and the memory device 3.

Embodiment 1

Figure 2:
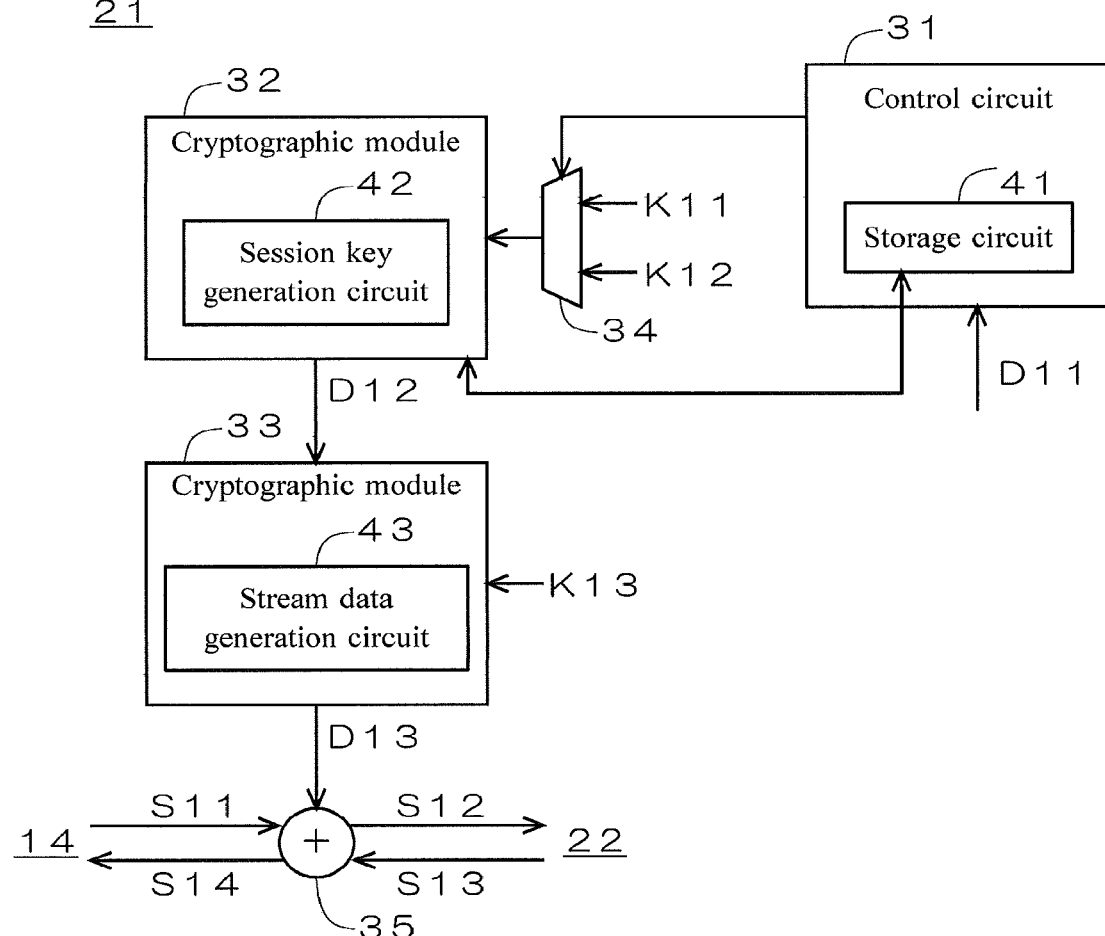
FIG. 2 is a diagram illustrating a configuration of a cryptographic block of a memory device.

FIG. 2 is a diagram illustrating a configuration of the cryptographic block 21 of the memory device 3. As illustrated in FIG. 2, the cryptographic block 21 includes a control circuit 31, cryptographic modules 32 and 33, a selector 34, and an arithmetic circuit 35. The control circuit 31 includes a storage circuit 41 such as a register. The cryptographic module 32 includes a session key generation circuit 42. The session key generation circuit 42 functions as a temporary data generation circuit that generates a session key D12 as temporary data, on the basis of key information (secret key K11 or dummy key K12) serving as input data from the selector 34. The cryptographic module 33 includes a stream data generation circuit 43. The stream data generation circuit 43 functions as an encryption circuit that generates stream data D13 for stream encryption on the basis of key information (secret key K13) and the session key D12 input from the session key generation circuit 42. The arithmetic circuit 35 performs an exclusive OR operation of an encrypted command S11 received from the host device 2 and the stream data D13 input from the stream data generation circuit 43 to restore a non-encrypted command S12. The arithmetic circuit 35 also performs an exclusive OR operation of non-encrypted data S13 read out from the memory array 22 and the stream data D13 input from the stream data generation circuit 43 to generate encrypted data S14.

Figure 3:
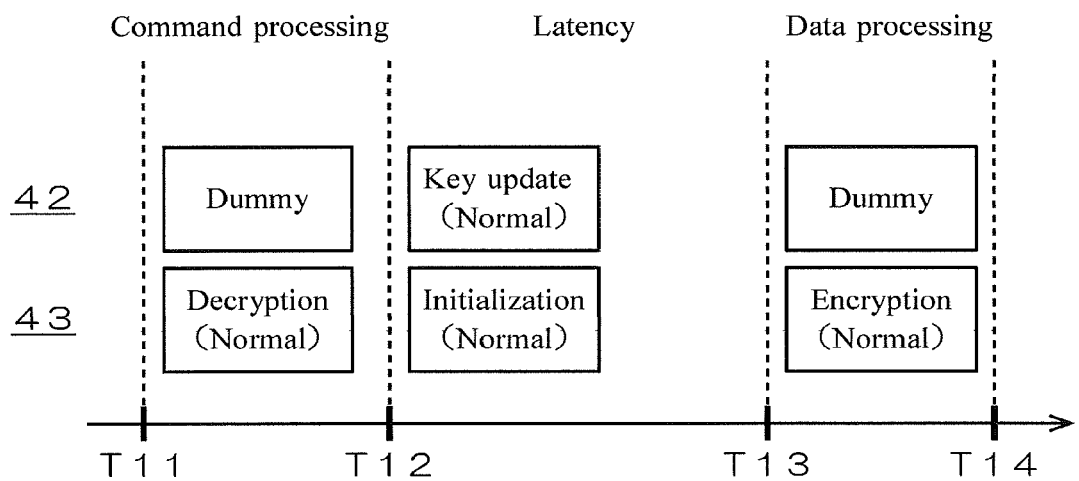
FIG. 3 is a timing diagram illustrating processing by a session key generation circuit and a stream data generation circuit.

FIG. 3 is a timing diagram illustrating processing by the session key generation circuit 42 and the stream data generation circuit 43. In a command processing period (times T11 to T12), the stream data generation circuit 43 generates the stream data D13 for encryption or decryption of commands or data as a normal operation, and thereby the encrypted command S11 is decrypted. Also in the command processing period, the session key generation circuit 42 performs a dummy operation that is not a normal operation. In a latency period (times T12 to T13), the session key generation circuit 42 updates the session key D12 as a normal operation. At the same time, the stream data generation circuit 43 is initialized with the current session key D12 before the update as a normal operation. In a data processing period (times T13 to T14) after readout of data from the memory array 22 is completed, the stream data generation circuit 43 generates the stream data D13 as a normal operation, and thereby the non-encrypted data S13 is encrypted. In the data processing period, the session key generation circuit 42 performs a dummy operation that is not a normal operation.

Description is given in detail below of an operation of the memory device 3, with an example of reading data stored in the memory array 22 out from the memory device 3 to the host device 2.

When the memory system 1 is started, the control circuit 31 reads out DPA control information D11 (ON/OFF flag information) stored in a predetermined location of the memory array 22. If the DPA control information D11 is ON, the control circuit 31 performs a below-described countermeasure process against DPA, while if OFF, the process is not performed. In the present embodiment, it is assumed that the DPA control information D11 is ON. The DPA control information D11 may be stored in a part of a command issued by the host device 2, in which case whether the countermeasure process against DPA should be performed can be easily switched by the host device 2.

In order to cause the session key generation circuit 42 to perform a dummy operation as the countermeasure process against DPA, the control circuit 31 reads out state transition information indicating current settings of the session key generation circuit 42 from the cryptographic module 32. The read-out state transition information is stored in the storage circuit 41. The control circuit 31 causes the selector 34 to select the dummy key K12. The dummy key K12 may have a fixed value, or a variable value generated with a random number generator. Alternatively, the dummy key K12 may be identical to the secret key K11.

The host device 2 then encrypts a readout command issued by the CPU 11 with the cryptographic block 14, so as to transmit the encrypted command S11 to the memory device 3.

In the command processing period (times T11 to T12), the session key generation circuit 42 performs a dummy operation to generate a dummy session key D12 on the basis of the dummy key K12. The generated dummy session key D12 is not input to the stream data generation circuit 43. In the command processing period, the stream data generation circuit 43 generates the stream data D13 on the basis of the latest session key D12 input from the session key generation circuit 42 as a normal operation, and thereby the encrypted command S11 is decrypted.

In the latency period (times T12 to T13), the control circuit 31 writes back the state transition information stored in the storage circuit 41 to the session key generation circuit 42. Thereby the settings of the session key generation circuit 42 are put back to the state before the dummy operation. The control circuit 31 causes the selector 34 to select the secret key K11. The session key generation circuit 42 updates the session key D12 as a normal operation, so as to generate a new session key D12 to be used in the next operation. At the same time, the stream data generation circuit 43 is initialized with the current session key D12 before the update as a normal operation.

In order to cause the session key generation circuit 42 to perform a dummy operation as the countermeasure process against DPA, the control circuit 31 reads out state transition information indicating current settings (that is, updated settings) of the session key generation circuit 42 from the cryptographic module 32. The read-out state transition information is stored in the storage circuit 41. The control circuit 31 causes the selector 34 to select the dummy key K12.

Then desired data S13 is read out from the memory array 22, on the basis of the non-encrypted command S12 restored by decryption of the encrypted command S11 as described above.

In the data processing period (times T13 to T14), the session key generation circuit 42 performs a dummy operation to generate the dummy session key D12 on the basis of the dummy key K12. The generated dummy session key D12 is not input to the stream data generation circuit 43. In the data processing period, the stream data generation circuit 43 generates the stream data D13 on the basis of the session key D12 input from the session key generation circuit 42 as a normal operation, and thereby the non-encrypted data S13 is encrypted. The encrypted data S14 is transmitted from the memory device 3 to the host device 2.

In the memory device 3 according to the present embodiment, in the command processing period and the data processing period (first period) in which the cryptographic module 33 (second cryptographic module) performs a normal operation while the cryptographic module 32 (first cryptographic module) does not perform a normal operation, the control circuit 31 causes the cryptographic module 32 to perform a dummy operation. The power consumption characteristic of the cryptographic module 33 is effectively hidden by causing the cryptographic module 32 to perform a dummy operation in the first period in which only the cryptographic module 33 performs a normal operation. In consequence, a countermeasure against the DPA attack is implemented at a low cost.

In the latency period (second period), the control circuit 31 causes both of the cryptographic module 32 and the cryptographic module 33 to perform a normal operation concurrently. The power consumption characteristic which would be revealed if only either one of the cryptographic module 32 and the cryptographic module 33 performs a normal operation is effectively hidden by causing the both modules to perform a normal operation concurrently. In consequence, a countermeasure against the DPA attack is implemented at a low cost.

In the first period, the control circuit 31 inputs the dummy key K12 (dummy input data) to the session key generation circuit 42 (temporary data generation circuit). Inputting the dummy key K12 to the session key generation circuit 42 effectively causes the session key generation circuit 42 to perform a dummy operation to generate the dummy session key D12 (dummy temporary data).

Fixing the value of the dummy key K12 on purpose to lead an attacker to anticipate some sort of key data generation offers a possibility that the attacker conducts a useless work of identifying the dummy key K12 by an analysis. In consequence, the secret key K11 is protected for an extended period. Moreover, fixing the value of the dummy key K12 achieves uniform power consumption of the session key generation circuit 42 due to a dummy operation.

On the other hand, varying the value of the dummy key K12 varies the power consumption of the session key generation circuit 42 every time the dummy key K12 is varied, and thereby effectively varies the power consumption of the memory device 3 as a whole. In consequence, the power consumption characteristic analysis by the DPA attack becomes more difficult.

In causing the cryptographic module 32 to perform a dummy operation, the control circuit 31 saves the latest state transition information of the session key generation circuit 42 in the storage circuit 41, and then in causing the session key generation circuit 42 to perform a normal operation, the state transition information stored in the storage circuit 41 is written back to the session key generation circuit 42. This achieves consistent generation of the session key D12 by the session key generation circuit 42 in a normal operation after a dummy operation.

Inputting the secret key K11 (key information) as input data enables the session key generation circuit 42 to generate the session key D12 as temporary data.

First Modification

The above Embodiment 1 is an example of implementing a countermeasure against DPA in the memory device 3, while the countermeasure against DPA may be implemented in the host device 2.

Figure 4:
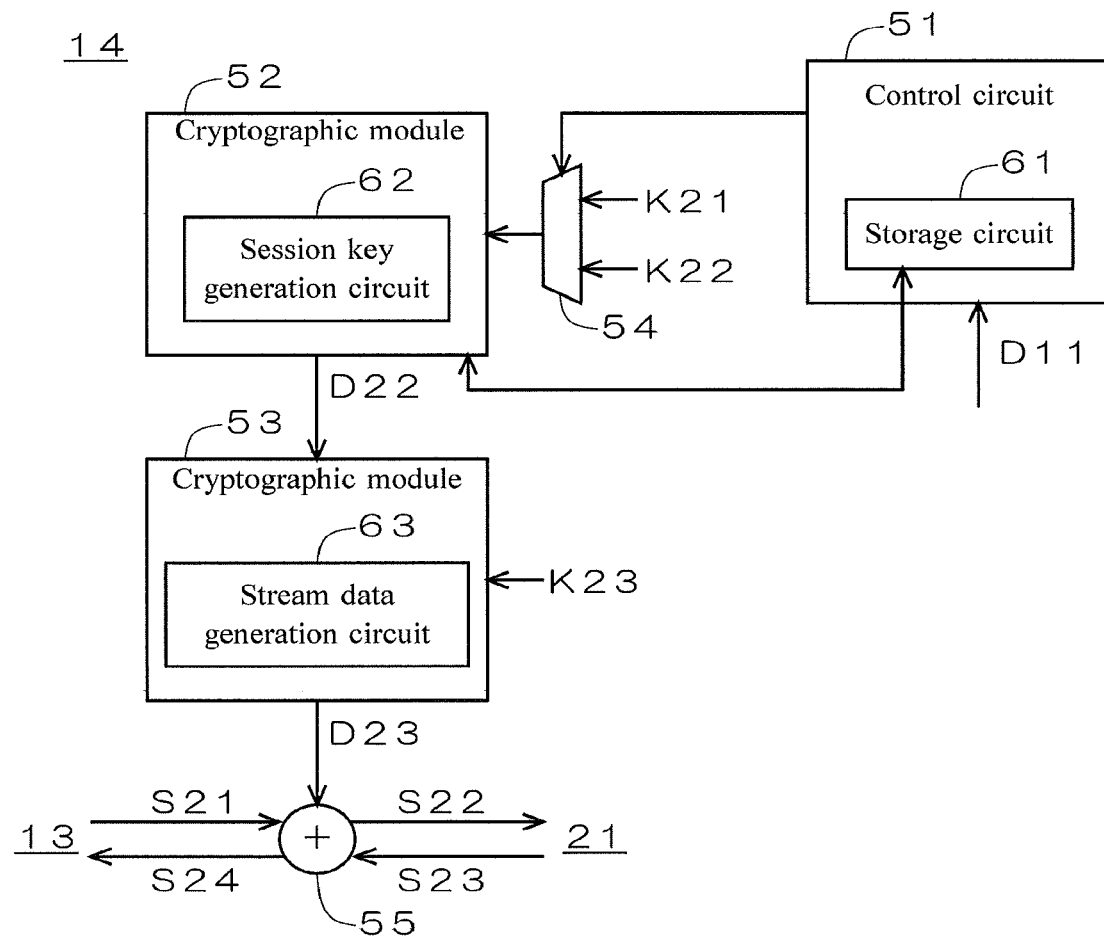
FIG. 4 is a diagram illustrating a configuration of a cryptographic block of a host device.

FIG. 4 is a diagram illustrating a configuration of the cryptographic block 14 of the host device 2. As illustrated in FIG. 4, the cryptographic block 14 includes a control circuit 51, cryptographic modules 52 and 53, a selector 54, and an arithmetic circuit 55. The control circuit 51 includes a storage circuit 61 such as a register. The cryptographic module 52 includes a session key generation circuit 62. The session key generation circuit 62 functions as a temporary data generation circuit that generates a session key D22 as temporary data, on the basis of key information (secret key K21 or dummy key K22) serving as input data from the selector 54. The cryptographic module 53 includes a stream data generation circuit 63. The stream data generation circuit 63 functions as an encryption circuit that generates stream data D23 for stream encryption on the basis of key information (secret key K23) and the session key D22 input from the session key generation circuit 62. The arithmetic circuit 55 performs an exclusive OR operation of encrypted data S23 received from the memory device 3 and the stream data D23 input from the stream data generation circuit 63 to restore non-encrypted data S24. The arithmetic circuit 55 also performs an exclusive OR operation of a non-encrypted command S21 input from the main control circuit 13 and the stream data D23 input from the stream data generation circuit 63 to generate an encrypted command S22.

Figure 5:
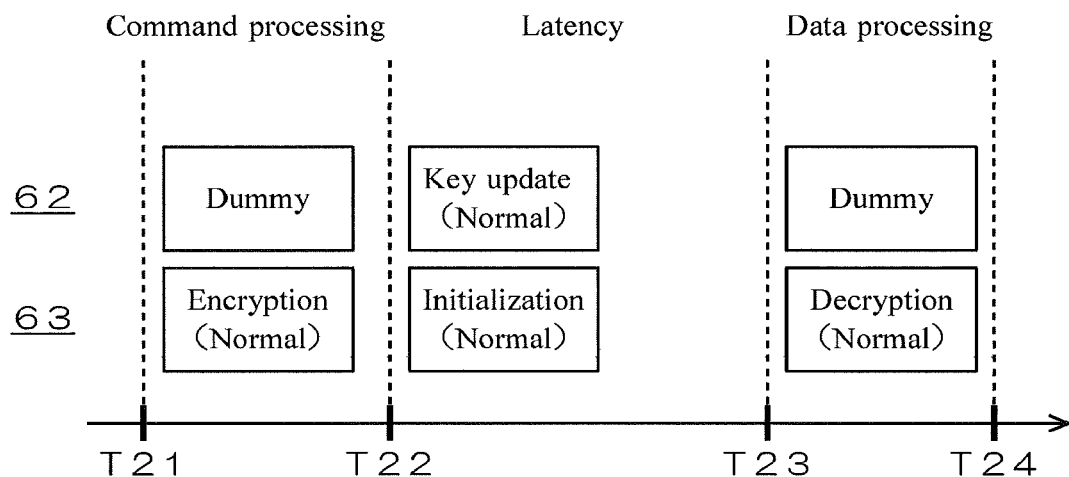
FIG. 5 is a timing diagram illustrating processing by a session key generation circuit and a stream data generation circuit.

FIG. 5 is a timing diagram illustrating processing by the session key generation circuit 62 and the stream data generation circuit 63. In a command processing period (times T21 to T22), the stream data generation circuit 63 generates the stream data D23 for encryption or decryption of commands or data as a normal operation, and thereby the non-encrypted command S21 is encrypted. Also in the command processing period, the session key generation circuit 62 performs a dummy operation that is not a normal operation. In a latency period (times T22 to T23), the session key generation circuit 62 updates the session key D22 as a normal operation. At the same time, the stream data generation circuit 63 is initialized with the current session key D22 before the update as a normal operation. In a data processing period (times T23 to T24), the stream data generation circuit 63 generates the stream data D23 as a normal operation, and thereby the encrypted data S23 is decrypted. In the data processing period, the session key generation circuit 62 performs a dummy operation that is not a normal operation.

Description is given in detail below of an operation of the host device 2, with an example of reading data stored in the memory array 22 out from the memory device 3 to the host device 2.

When the memory system 1 is started, the control circuit 51 reads out DPA control information D11 stored in a predetermined location of the memory array 22. If the DPA control information D11 is ON, the control circuit 51 performs a below-described countermeasure process against DPA, while if OFF, the process is not performed. In the present modification, it is assumed that the DPA control information D11 is ON.

In order to cause the session key generation circuit 62 to perform a dummy operation as the countermeasure process against DPA, the control circuit 51 reads out state transition information indicating current settings of the session key generation circuit 62 from the cryptographic module 52. The read-out state transition information is stored in the storage circuit 61. The control circuit 51 causes the selector 54 to select the dummy key K22. The dummy key K22 may have a fixed value, or a variable value generated with a random number generator. Alternatively, the dummy key K22 may be identical to the secret key K21.

The CPU 11 issues a non-encrypted readout command S21. The command S21 is input to the cryptographic block 14 via the main control circuit 13.

In the command processing period (times T21 to T22), the session key generation circuit 62 performs a dummy operation to generate a dummy session key D22 on the basis of the dummy key K22. The generated dummy session key D22 is not input to the stream data generation circuit 63. In the command processing period, the stream data generation circuit 63 generates the stream data D23 on the basis of the latest session key D22 input from the session key generation circuit 62 as a normal operation, and thereby the non-encrypted command S21 is encrypted.

In the latency period (times T22 to T23), the control circuit 51 writes back the state transition information stored in the storage circuit 61 to the session key generation circuit 62. Thereby the settings of the session key generation circuit 62 are put back to the state before the dummy operation. The control circuit 51 causes the selector 54 to select the secret key K21. The session key generation circuit 62 updates the session key D22 as a normal operation, so as to generate a new session key D22 to be used in the next operation. At the same time, the stream data generation circuit 63 is initialized with the current session key D22 before the update as a normal operation.

In order to cause the session key generation circuit 62 to perform a dummy operation as the countermeasure process against DPA, the control circuit 51 reads out state transition information indicating current settings (that is, updated settings) of the session key generation circuit 62 from the cryptographic module 52. The read-out state transition information is stored in the storage circuit 61. The control circuit 51 causes the selector 54 to select the dummy key K22.

In the data processing period (times T23 to T24), the session key generation circuit 62 performs a dummy operation to generate the dummy session key D22 on the basis of the dummy key K22. The generated dummy session key D22 is not input to the stream data generation circuit 63. In the data processing period, the stream data generation circuit 63 generates the stream data D23 on the basis of the session key D22 input from the session key generation circuit 62 as a normal operation, and thereby the encrypted data S23 received from the memory device 3 is decrypted. The decrypted data S24 is input to the CPU 11 via the main control circuit 13. In the host device 2 according to the present modification, in the command processing period and the data processing period (first period) in which the cryptographic module 53 (second cryptographic module) performs a normal operation while the cryptographic module 52 (first cryptographic module) does not perform a normal operation, the control circuit 51 causes the cryptographic module 52 to perform a dummy operation. The power consumption characteristic of the cryptographic module 53 is effectively hidden by causing the cryptographic module 52 to perform a dummy operation in the first period in which only the cryptographic module 53 performs a normal operation. In consequence, a countermeasure against the DPA attack is implemented at a low cost.

In the latency period (second period), the control circuit 51 causes both of the cryptographic module 52 and the cryptographic module 53 to perform a normal operation concurrently. The power consumption characteristic which would be revealed if only either one of the cryptographic module 52 and the cryptographic module 53 performs a normal operation is effectively hidden by causing the both modules to perform a normal operation concurrently. In consequence, a countermeasure against the DPA attack is implemented at a low cost.

In the first period, the control circuit 51 inputs the dummy key K22 (dummy input data) to the session key generation circuit 62 (temporary data generation circuit). Inputting the dummy key K22 to the session key generation circuit 62 effectively causes the session key generation circuit 62 to perform a dummy operation to generate the dummy session key D22 (dummy temporary data).

Fixing the value of the dummy key K22 on purpose to lead an attacker to anticipate some sort of key data generation offers a possibility that the attacker conducts a useless work of identifying the dummy key K22 by an analysis. In consequence, the secret key K21 is protected for an extended period. Moreover, fixing the value of the dummy key K22 achieves uniform power consumption of the session key generation circuit 62 due to a dummy operation.

On the other hand, varying the value of the dummy key K22 varies the power consumption of the session key generation circuit 62 every time the dummy key K22 is varied, and thereby varies the power consumption of the host device 2 as a whole. In consequence, the power consumption characteristic analysis by the DPA attack becomes more difficult.

In causing the cryptographic module 52 to perform a dummy operation, the control circuit 51 saves the latest state transition information of the session key generation circuit 62 in the storage circuit 61, and then in causing the session key generation circuit 62 to perform a normal operation, the state transition information stored in the storage circuit 61 is written back to the session key generation circuit 62. This achieves consistent generation of the session key D22 by the session key generation circuit 62 in a normal operation after a dummy operation.

Inputting the secret key K21 (key information) as input data enables the session key generation circuit 62 to generate the session key D22 as temporary data.

The countermeasure against DPA may be implemented in both of the host device 2 and the memory device 3, which enhances the resistance against the DPA attack of the memory system 1 as a whole.

Second Modification

In the above Embodiment 1, whether the countermeasure process against DPA should be performed is determined on the basis of the DPA control information D11, while whether the countermeasure process against DPA should be performed may be subject to a presence of an unauthorized access from the host device 2 to the memory device 3.

Figure 6:
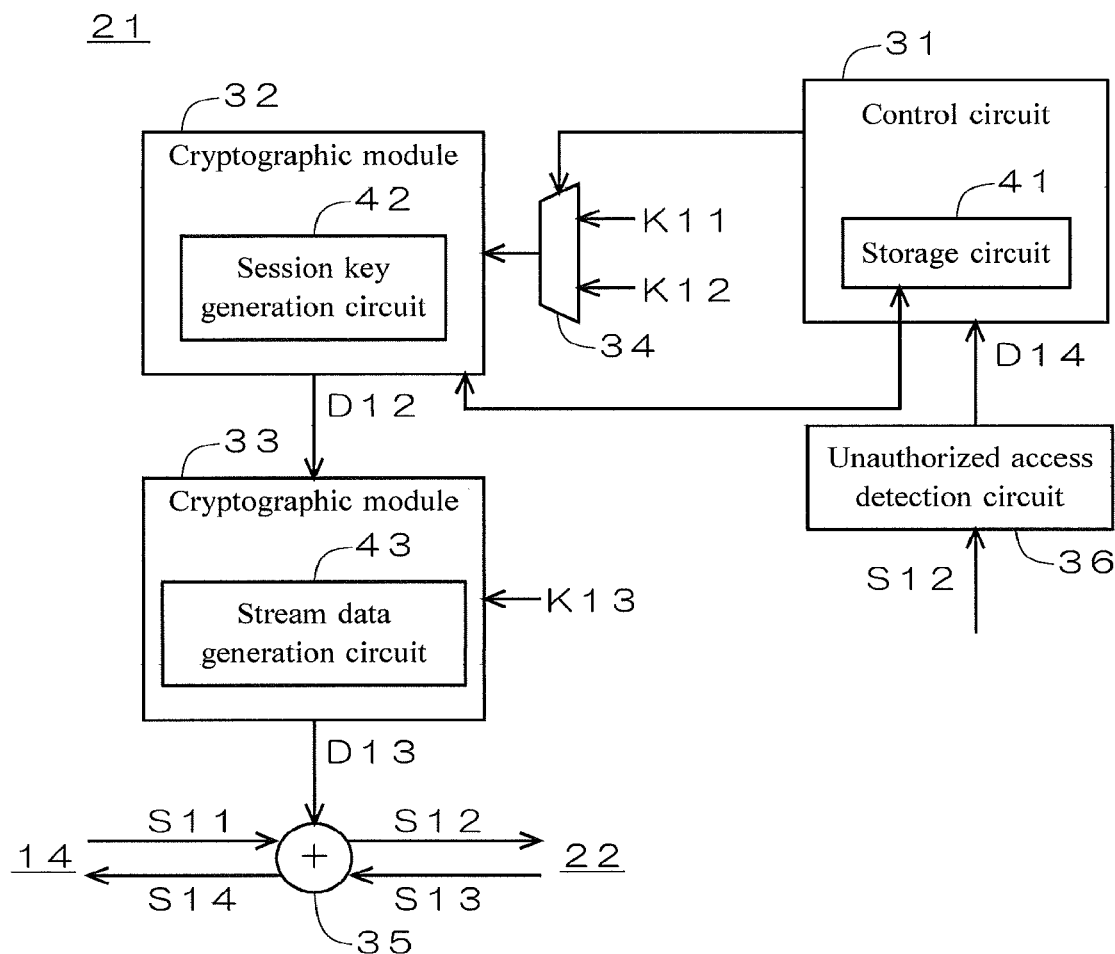
FIG. 6 is a diagram illustrating a configuration of the cryptographic block of the memory device.

FIG. 6 is a diagram illustrating a configuration of the cryptographic block 21 of the memory device 3. An unauthorized access detection circuit 36 is added to the configuration illustrated in FIG. 2. The unauthorized access detection circuit 36 receives the non-encrypted command S12 restored by decryption from the arithmetic circuit 35.

The unauthorized access detection circuit 36 determines an access as unauthorized when requests, such as an access request to a predetermined access-prohibited area, an access request exceeding the data capacity of the memory array 22, an access request by an undefined command with no defined command ID, and an access request by a sequence other than a specified command sequence, are received from the host device 2, and inputs an unauthorized access detection signal D14 to the control circuit 31.

The control circuit 31 performs the countermeasure process against DPA described in the above embodiment subject to an input of the unauthorized access detection signal D14.

In the memory device 3 according to the present modification, the control circuit 31 performs a countermeasure process against DPA when the unauthorized access detection circuit 36 detects an unauthorized access. The availability of the memory system 1 is therefore ensured, while power consumption that would be unnecessarily increased if a dummy operation is performed without an unauthorized access is prevented.

Embodiment 2

Figure 7:
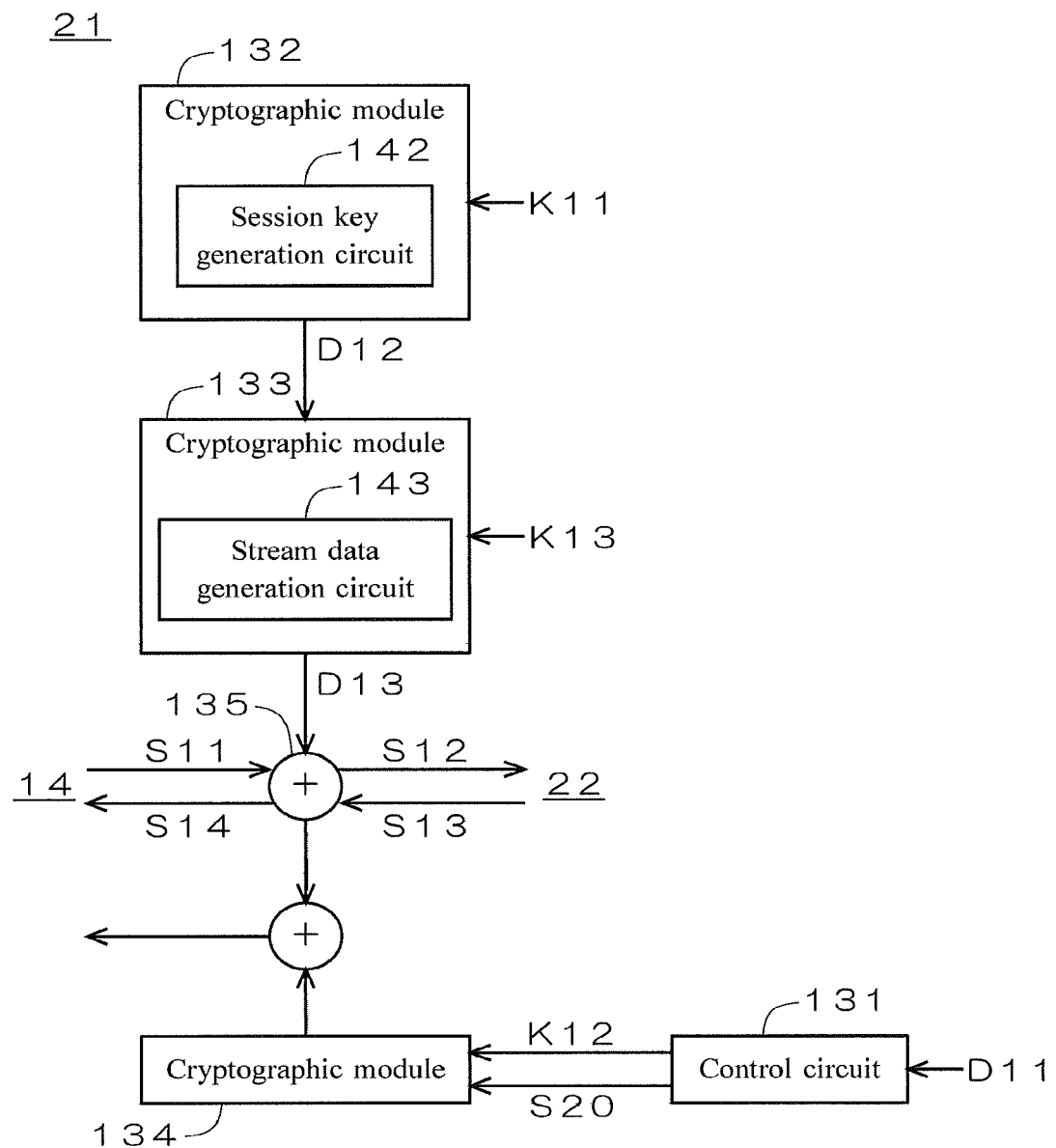
FIG. 7 is a diagram illustrating a configuration of the cryptographic block of the memory device.

FIG. 7 is a diagram illustrating a configuration of the cryptographic block 21 of the memory device 3. As illustrated in FIG. 7, the cryptographic block 21 includes a control circuit 131, cryptographic modules 132 to 134, and an arithmetic circuit 135. The cryptographic module 132 includes a session key generation circuit 142. The session key generation circuit 142 functions as a temporary data generation circuit that generates a session key D12 as temporary data, on the basis of key information (secret key K11) serving as input data. The cryptographic module 133 includes a stream data generation circuit 143. The stream data generation circuit 143 functions as an encryption circuit that generates stream data D13 for stream encryption on the basis of key information (secret key K13) and the session key D12 input from the session key generation circuit 142. The arithmetic circuit 135 performs an exclusive OR operation of an encrypted command S11 received from the host device 2 and the stream data D13 input from the stream data generation circuit 143 to restore a non-encrypted command S12. The arithmetic circuit 135 performs an exclusive OR operation of non-encrypted data S13 read out from the memory array 22 and the stream data D13 input from the stream data generation circuit 143 to generate encrypted data S14.

The cryptographic module 134 has a cryptographic algorithm different from those of cryptographic modules 132 and 133, and performs a dummy operation that does not contribute to encryption and decryption of commands or data. The cryptographic module 134 receives a control signal S20 and key information (dummy key K12) from the control circuit 131. The dummy key K12 may have a fixed value, or a variable value generated with a random number generator. Alternatively, the dummy key K12 may be identical to the secret key K11 or K13. The cryptographic module 134 may have the same cryptographic algorithm as the cryptographic module 132 or 133, in which case a key different from the secret keys K11 and K13 is employed as the dummy key K12.

Figure 8:
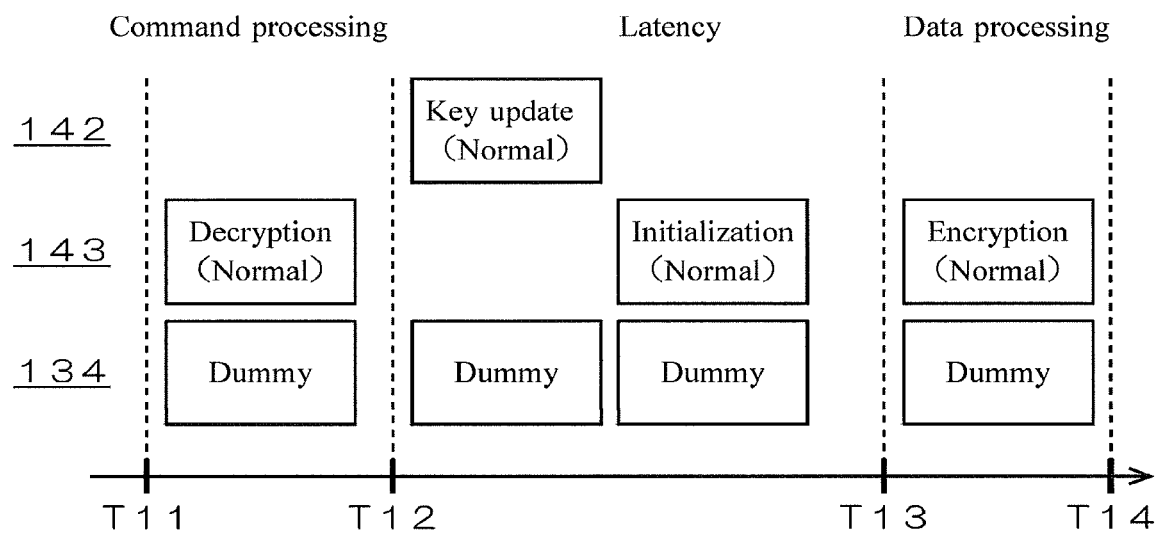
FIG. 8 is a timing diagram illustrating processing by a session key generation circuit, a stream data generation circuit, and a cryptographic module.

FIG. 8 is a timing diagram illustrating processing by the session key generation circuit 142, the stream data generation circuit 143, and the cryptographic module 134.

In a command processing period (times T11 to T12), the stream data generation circuit 143 generates the stream data D13 for encryption or decryption of commands or data as a normal operation, and thereby the encrypted command S11 is decrypted. In the command processing period, the session key generation circuit 142 does not perform an operation while the cryptographic module 134 performs a dummy operation in synchronization with the operational period of the stream data generation circuit 143.

In a latency period (times T12 to T13), the session key generation circuit 142 updates the session key D12 as a normal operation. Then the stream data generation circuit 143 is initialized with the updated session key D12 as a normal operation. In the latency period, the cryptographic module 134 performs a dummy operation in synchronization with the operational periods of the session key generation circuit 142 and the stream data generation circuit 143.

In a data processing period (times T13 to T14) after readout of data from the memory array 22 is completed, the stream data generation circuit 143 generates the stream data D13 as a normal operation, and thereby the non-encrypted data S13 is encrypted. In the data processing period, the session key generation circuit 142 does not perform an operation while the cryptographic module 134 performs a dummy operation in synchronization with the operational period of the stream data generation circuit 143.

Description is given in detail below of an operation of the memory device 3, with an example of reading data stored in the memory array 22 out from the memory device 3 to the host device 2.

When the memory system 1 is started, the control circuit 131 reads out DPA control information D11 (ON/OFF flag information) stored in a predetermined location of the memory array 22. If the DPA control information D11 is ON, the control circuit 131 performs a below-described countermeasure process against DPA, while if OFF, the process is not performed. In the present embodiment, it is assumed that the DPA control information D11 is ON. The DPA control information D11 may be stored in a part of a command issued by the host device 2, in which case whether the countermeasure process against DPA should be performed can be easily switched by the host device 2.

In order to cause the cryptographic module 134 to perform a dummy operation as the countermeasure process against DPA, the control circuit 131 inputs the control signal S20 and the dummy key K12 to the cryptographic module 134.

The host device 2 then encrypts a readout command issued by the CPU 11 with the cryptographic block 14, so as to transmit the encrypted command S11 to the memory device 3.

In the command processing period (times T11 to T12), the stream data generation circuit 143 generates the stream data D13 on the basis of the latest session key D12 input from the session key generation circuit 142 as a normal operation, and thereby the encrypted command S11 is decrypted. The cryptographic module 134 performs a dummy operation on the basis of the dummy key K12 in synchronization with the operational period of the stream data generation circuit 143. The data generated in the dummy operation of the cryptographic module 134 may be deleted in the memory device 3, or may be output from the memory device 3 as dummy data.

In the latency period (times T12 to T13), the session key generation circuit 142 updates the session key D12 as a normal operation, so as to generate a new session key D12. The cryptographic module 134 performs a dummy operation in synchronization with the operational period of the session key generation circuit 142. Then the stream data generation circuit 143 is initialized with the updated session key D12 as a normal operation. The cryptographic module 134 also performs a dummy operation in synchronization with the operational period of the stream data generation circuit 143. Then desired data S13 is read out from the memory array 22, on the basis of the non-encrypted command S12 restored by decryption of the encrypted command S11 as described above.

In the data processing period (times T13 to T14), the stream data generation circuit 143 generates the stream data D13 on the basis of the updated session key D12 input from the session key generation circuit 142 as a normal operation, and thereby the non-encrypted data S13 is encrypted. The encrypted data S14 is transmitted from the memory device 3 to the host device 2. The cryptographic module 134 performs a dummy operation in synchronization with the operational period of the stream data generation circuit 143.

In the memory device 3 according to the present embodiment, in a period in which one of the cryptographic module 132 (first cryptographic module) and the cryptographic module 133 (second cryptographic module) performs a normal operation, the control circuit 131 causes the cryptographic module 134 (third cryptographic module) to perform a dummy operation. The power consumption characteristic of the cryptographic module 132 or 133 which performs a normal operation is effectively hidden by causing the cryptographic module 134 to perform a dummy operation. In consequence, a countermeasure against the DPA attack is implemented at a low cost.

Fixing the value of the dummy key K12 on purpose to lead an attacker to anticipate some sort of key data generation offers a possibility that the attacker conducts a useless work of identifying the dummy key K12 by an analysis. In consequence, the secret keys K11 and K13 are protected for an extended period. Moreover, fixing the value of the dummy key K12 achieves uniform power consumption of the cryptographic module 134 due to a dummy operation.

On the other hand, varying the value of the dummy key K12 varies the power consumption of the cryptographic module 134 every time the dummy key K12 is varied, and thereby effectively varies the power consumption of the memory device 3 as a whole. In consequence, the power consumption characteristic analysis by the DPA attack becomes more difficult.

Inputting the secret key K11 (key information) as input data enables the session key generation circuit 142 to generate the session key D12 as temporary data.

Third Modification

The above Embodiment 2 is an example of implementing a countermeasure against DPA in the memory device 3, while the countermeasure against DPA may be implemented in the host device 2.

Figure 9:
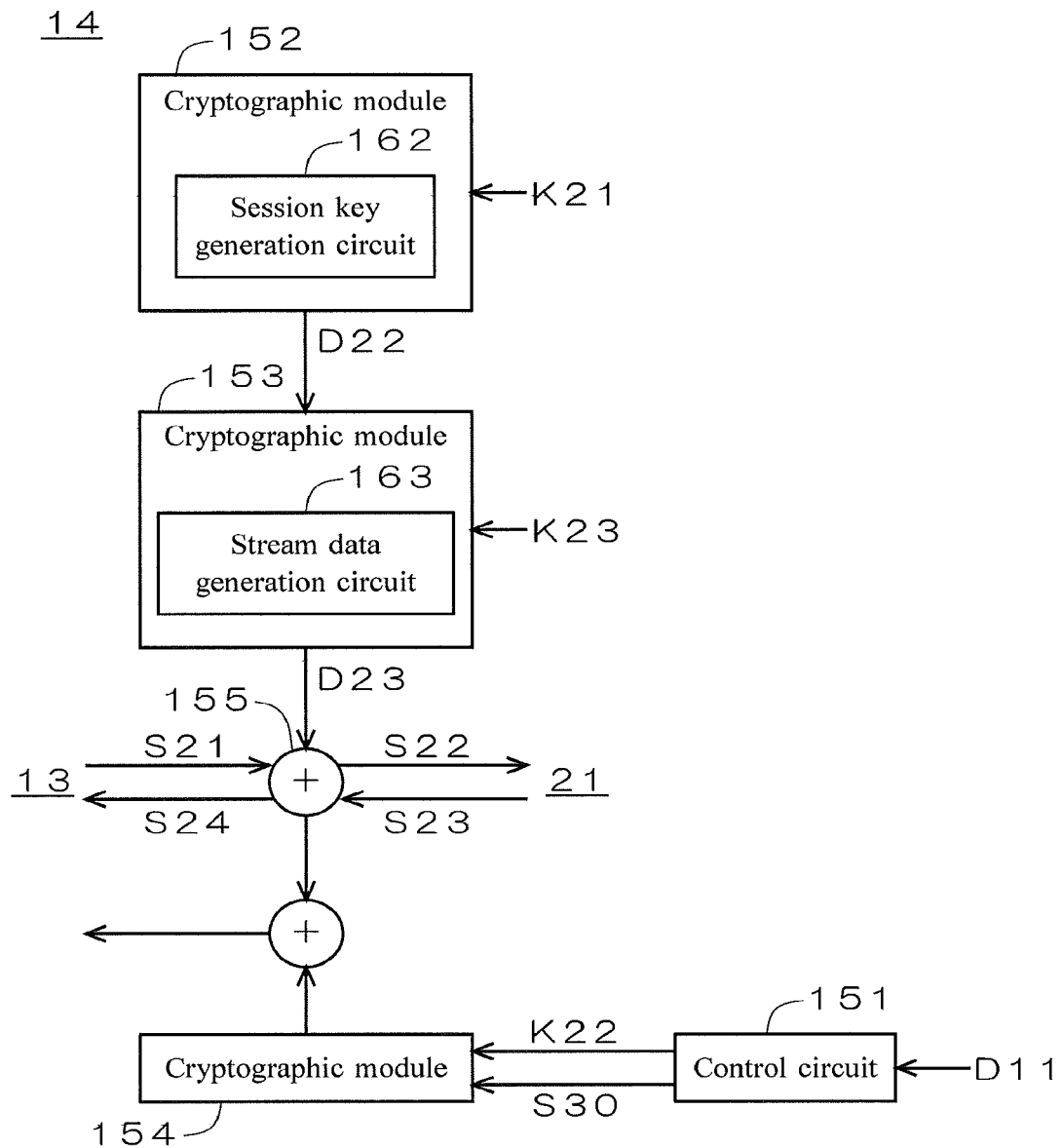
FIG. 9 is a diagram illustrating a configuration the cryptographic block of the host device.

FIG. 9 is a diagram illustrating a configuration of the cryptographic block 14 of the host device 2. As illustrated in FIG. 9, the cryptographic block 14 includes a control circuit 151, cryptographic modules 152 to 154, and an arithmetic circuit 155. The cryptographic module 152 includes a session key generation circuit 162. The session key generation circuit 162 functions as a temporary data generation circuit that generates a session key D22 as temporary data, on the basis of key information (secret key K21) serving as input data. The cryptographic module 153 includes a stream data generation circuit 163. The stream data generation circuit 163 functions as an encryption circuit that generates stream data D23 for stream encryption on the basis of key information (secret key K23) and the session key D22 input from the session key generation circuit 162. The arithmetic circuit 155 performs an exclusive OR operation of encrypted data S23 received from the memory device 3 and the stream data D23 input from the stream data generation circuit 163 to restore non-encrypted data S24. The arithmetic circuit 155 also performs an exclusive OR operation of a non-encrypted command S21 input from the main control circuit 13 and the stream data D23 input from the stream data generation circuit 163 to generate an encrypted command S22.

The cryptographic module 154 has a cryptographic algorithm different from those of the cryptographic modules 152 and 153, and performs a dummy operation that does not contribute to encryption and decryption of commands or data. The cryptographic module 154 may receive a control signal S30 and key information (dummy key K22) from the control circuit 151. The dummy key K22 may have a fixed value, or a variable value generated with a random number generator. Alternatively, the dummy key K22 may be identical to the secret key K21 or K23. The cryptographic module 154 may have the same cryptographic algorithm as the cryptographic module 152 or 153, in which case a key different from the secret keys K21 and K23 is employed as the dummy key K22.

Figure 10:
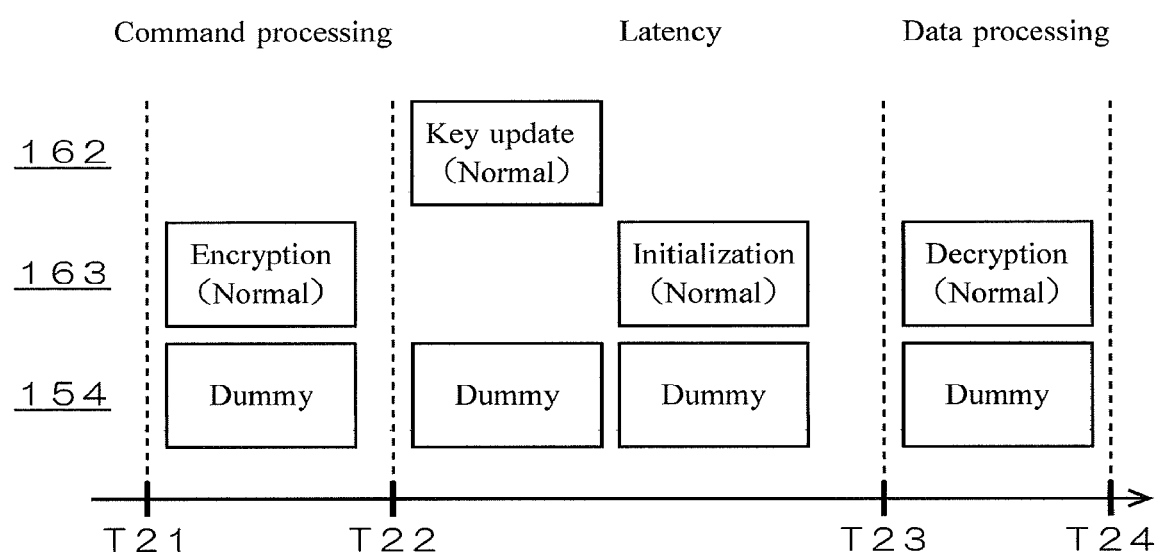
FIG. 10 is a timing diagram illustrating processing by a session key generation circuit, a stream data generation circuit, and a cryptographic module.

FIG. 10 is a timing diagram illustrating processing by the session key generation circuit 162, the stream data generation circuit 163, and the cryptographic module 154.

In a command processing period (times T21 to T22), the stream data generation circuit 163 generates the stream data D23 for encryption or decryption of commands or data as a normal operation, and thereby the non-encrypted command S21 is encrypted. In the command processing period, the session key generation circuit 162 does not perform an operation while the cryptographic module 154 performs a dummy operation in synchronization with the operational period of the stream data generation circuit 163.

In a latency period (times T22 to T23), the session key generation circuit 162 updates the session key D22 as a normal operation. Then the stream data generation circuit 163 is initialized with the updated session key D22 as a normal operation. In the latency period, the cryptographic module 154 performs a dummy operation in synchronization with the operational periods of the session key generation circuit 162 and the stream data generation circuit 163.

In a data processing period (times T23 to T24), the stream data generation circuit 163 generates the stream data D23 as a normal operation, and thereby the encrypted data S23 is decrypted. In the data processing period, the session key generation circuit 162 does not perform an operation while the cryptographic module 154 performs a dummy operation in synchronization with the operational period of the stream data generation circuit 163.

Description is given in detail below of an operation of the host device 2, with an example of reading data stored in the memory array 22 out from the memory device 3 to the host device 2.

When the memory system 1 is started, the control circuit 151 reads out DPA control information D11 stored in a predetermined location of the memory array 22. If the DPA control information D11 is ON, the control circuit 151 performs a below-described countermeasure process against DPA, while if OFF, the process is not performed. In the present modification, it is assumed that the DPA control information D11 is ON.

The CPU 11 issues a non-encrypted readout command S21. The command S21 is input to the cryptographic block 14 via the main control circuit 13.

In the command processing period (times T21 to T22), the stream data generation circuit 163 generates the stream data D23 on the basis of the latest session key D22 input from the session key generation circuit 162 as a normal operation, and thereby the non-encrypted command S21 is encrypted. The cryptographic module 154 performs a dummy operation on the basis of the dummy key K22 in synchronization with the operational period of the stream data generation circuit 163. The data generated in the dummy operation of the cryptographic module 154 may be deleted in the host device 2, or may be output from the host device 2 as dummy data.

In the latency period (times T22 to T23), the session key generation circuit 162 updates the session key D22 as a normal operation, so as to generate a new session key D22. The cryptographic module 154 performs a dummy operation in synchronization with the operational period of the session key generation circuit 162. The stream data generation circuit 163 is initialized with the updated session key D22 as a normal operation. The cryptographic module 154 also performs a dummy operation in synchronization with the operational period of the stream data generation circuit 163.

In the data processing period (times T23 to T24), the stream data generation circuit 163 generates the stream data D23 on the basis of the updated session key D22 input from the session key generation circuit 162 as a normal operation, and thereby the encrypted data S23 is decrypted. The decrypted data S24 is input to the CPU 11 via the main control circuit 13.

In the host device 2 according to the present modification, in a period in which one of the cryptographic module 152 (first cryptographic module) and the cryptographic module 153 (second cryptographic module) performs a normal operation, the control circuit 151 causes the cryptographic module 154 (third cryptographic module) to perform a dummy operation. The power consumption characteristic of the cryptographic module 152 or 153 which performs a normal operation is effectively hidden by causing the cryptographic module 154 to perform a dummy operation. In consequence, a countermeasure against the DPA attack is implemented at a low cost.

Fixing the value of the dummy key K22 on purpose to lead an attacker to anticipate some sort of key data generation offers a possibility that the attacker conducts a useless work of identifying the dummy key K22 by an analysis. In consequence, the secret keys K21 and K23 are protected for an extended period. Moreover, fixing the value of the dummy key K22 achieves uniform power consumption of the cryptographic module 154 due to a dummy operation.

On the other hand, varying the value of the dummy key K22 varies the power consumption of the cryptographic module 154 every time the dummy key K22 is varied, and thereby effectively varies the power consumption of the host device 2 as a whole. In consequence, the power consumption characteristic analysis by the DPA attack becomes more difficult.

Inputting the secret key K21 (key information) as input data enables the session key generation circuit 162 to generate the session key D22 as temporary data.

Fourth Modification

The above Embodiment 2 is an example of determining whether the countermeasure process against DPA should be performed on the basis of the DPA control information D11, while whether the countermeasure process against DPA should be performed may be subject to a presence of an unauthorized access from the host device 2 to the memory device 3.

Figure 11:
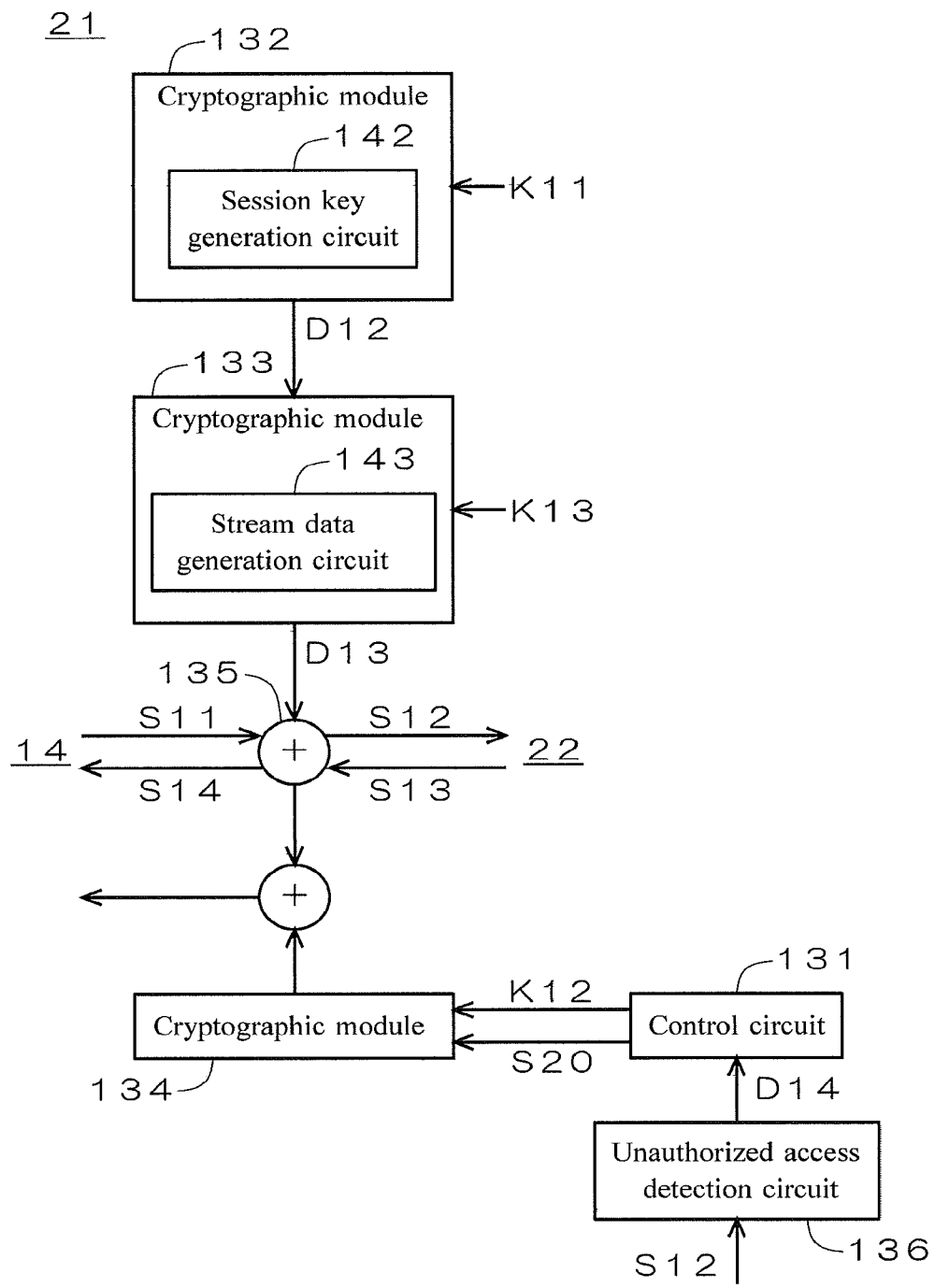
FIG. 11 is a diagram illustrating a configuration of the cryptographic block of the memory device.

FIG. 11 is a diagram illustrating a configuration of the cryptographic block 21 of the memory device 3. An unauthorized access detection circuit 136 is added to the configuration illustrated in FIG. 7. The unauthorized access detection circuit 136 receives the non-encrypted command S12 restored by decryption from the arithmetic circuit 135.

The unauthorized access detection circuit 136 determines an access as unauthorized when requests, such as an access request to a predetermined access-prohibited area, an access request exceeding the data capacity of the memory array 22, an access request by an undefined command with no defined command ID, and an access request by a sequence other than a specified command sequence, are received from the host device 2, and inputs an unauthorized access detection signal D14 to the control circuit 131.

The control circuit 131 performs the countermeasure process against DPA described in the above Embodiment 2 subject to an input of the unauthorized access detection signal D14. In the memory device 3 according to the present modification, the control circuit 131 performs a countermeasure process against DPA when the unauthorized access detection circuit 136 detects an unauthorized access. The availability of the memory system 1 is therefore ensured, while power consumption that would be unnecessarily increased if a dummy operation is performed without an unauthorized access is prevented.

Fifth Modification

Figure 12:
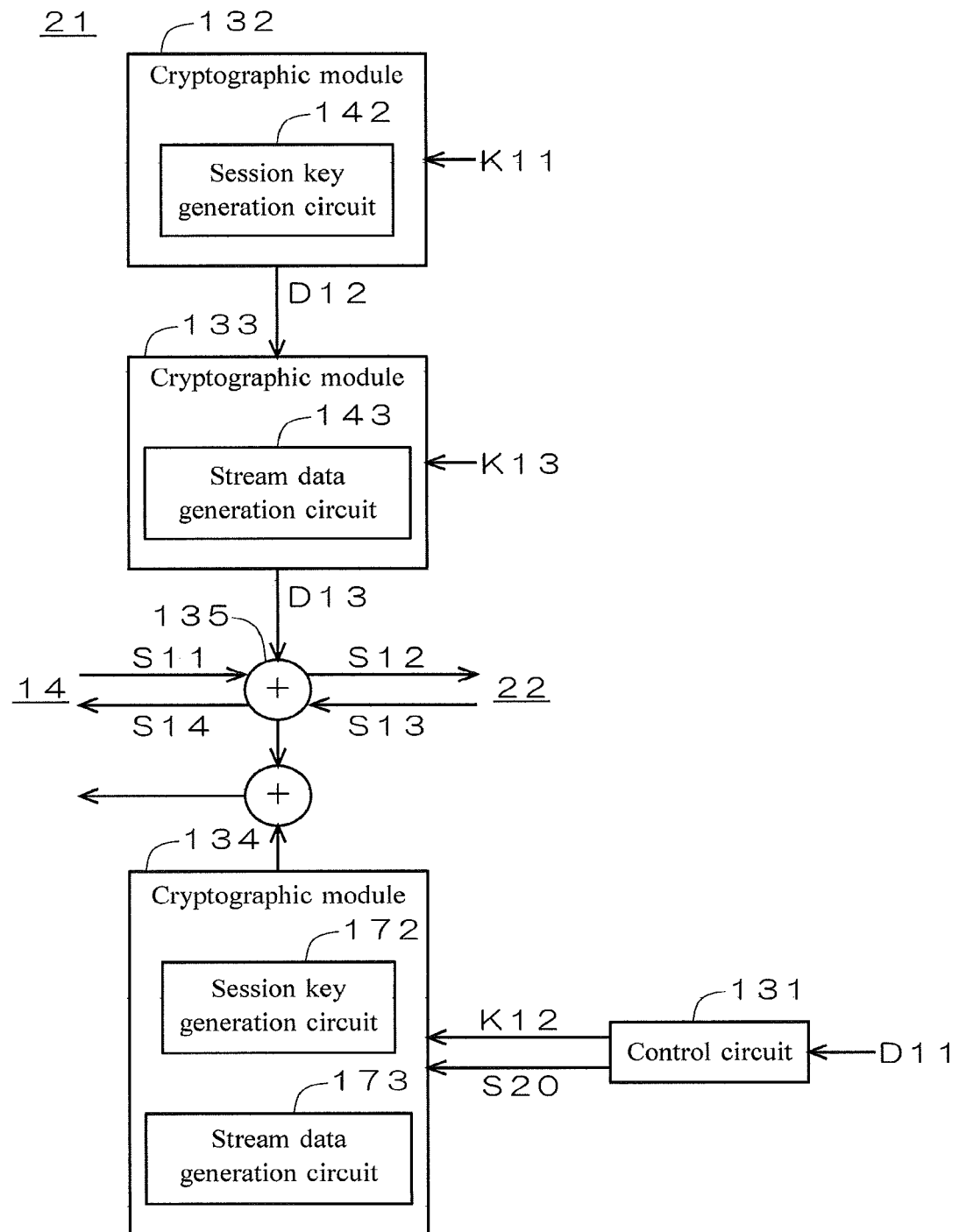
FIG. 12 is a diagram illustrating a configuration of the cryptographic block of the memory device.

FIG. 12 is a diagram illustrating a configuration of the cryptographic block 21 of the memory device 3. As illustrated in FIG. 12, the cryptographic block 21 includes a control circuit 131, cryptographic modules 132 to 134, and an arithmetic circuit 135. The cryptographic module 134 includes a session key generation circuit 172 (second temporary data generation circuit) similar to the session key generation circuit 142 (first temporary data generation circuit), and a stream data generation circuit 173 (second encryption circuit) similar to the stream data generation circuit 143 (first encryption circuit).

Figure 13:
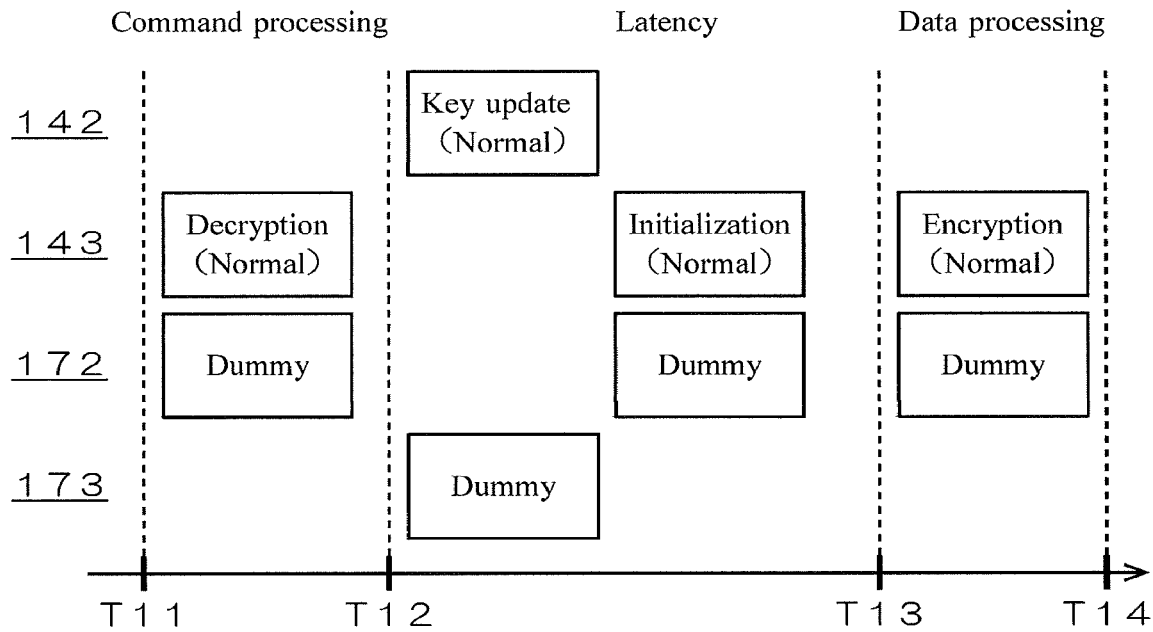
FIG. 13 is a timing diagram illustrating processing by a session key generation circuit and a stream data generation circuit.

FIG. 13 is a timing diagram illustrating processing by the session key generation circuits 142 and 172 and the stream data generation circuits 143 and 173.

In a command processing period (times T11 to T12), the stream data generation circuit 143 generates the stream data D13 as a normal operation, and thereby the encrypted command S11 is decrypted. At this time, the session key generation circuit 142 and the stream data generation circuit 173 do not perform an operation, while the session key generation circuit 172 performs a dummy operation in synchronization with the operational period of the stream data generation circuit 143.

In a latency period (times T12 to T13), the session key generation circuit 142 updates the session key D12 as a normal operation. At this time, the stream data generation circuit 143 and the session key generation circuit 172 do not perform an operation, while the stream data generation circuit 173 performs a dummy operation in synchronization with the operational period of the session key generation circuit 142. Then the stream data generation circuit 143 is initialized with the updated session key D12 as a normal operation. At this time, the session key generation circuit 142 and the stream data generation circuit 173 do not perform an operation, while the session key generation circuit 172 performs a dummy operation in synchronization with the operational period of the stream data generation circuit 143.

In a data processing period (times T13 to T14), the stream data generation circuit 143 generates the stream data D13 as a normal operation, and thereby the non-encrypted data S13 is encrypted. At this time, the session key generation circuit 142 and the stream data generation circuit 173 do not perform an operation, while the session key generation circuit 172 performs a dummy operation in synchronization with the operational period of the stream data generation circuit 143.

In the memory device 3 according to the present modification, the control circuit 131 causes the stream data generation circuit 173 to perform a dummy operation in a period in which only the session key generation circuit 142 performs a normal operation, while causing the session key generation circuit 172 to perform a dummy operation in a period in which only the stream data generation circuit 143 performs a normal operation. The power consumption of the memory device 3 as a whole is thereby uniformed, and thus the power consumption characteristic analysis by the DPA attack becomes more difficult.

The above description is an example of applying the present modification to the memory device 3, while the present modification is also applicable to the host device 2 with similar advantage.

Sixth Modification

Figure 14:
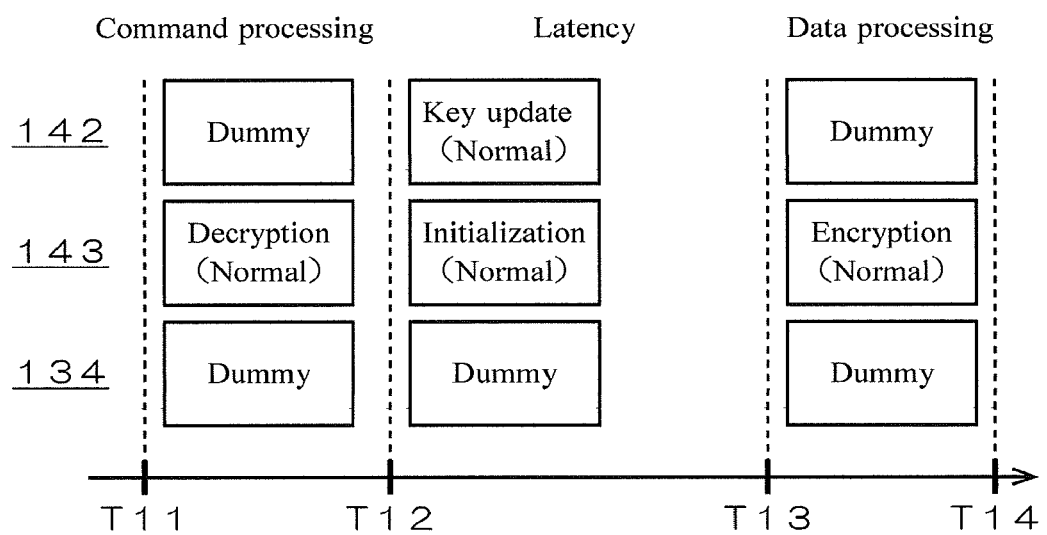
FIG. 14 is a timing diagram illustrating processing by a session key generation circuit, a stream data generation circuit, and a cryptographic module.

FIG. 14 is a timing diagram illustrating processing by the session key generation circuit 142, the stream data generation circuit 143, and the cryptographic module 134.

In a command processing period (times T11 to T12), the stream data generation circuit 143 generates the stream data D13 as a normal operation, and thereby the encrypted command S11 is decrypted. At this time, the session key generation circuit 142 and the cryptographic module 134 perform a dummy operation in synchronization with the operational period of the stream data generation circuit 143.

In order to cause the session key generation circuit 142 to perform a dummy operation, the control circuit 131 reads out state transition information indicating current settings of the session key generation circuit 142 from the cryptographic module 132, and stores this state transition information in a storage circuit inside the control circuit 131. The control circuit 131 inputs a dummy key having a fixed or variable value in place of the secret key K11 to the session key generation circuit 142. The session key generation circuit 142 generates the dummy session key D12 on the basis of this dummy key.

In a latency period (times T12 to T13), the control circuit 131 writes back the state transition information stored in the storage circuit to the session key generation circuit 142. Thereby the settings of the session key generation circuit 142 are put back to the state before the dummy operation. The control circuit 131 also inputs the secret key K11 in place of the dummy key to the session key generation circuit 142. The session key generation circuit 142 updates the session key D12 as a normal operation, so as to generate a new session key D12 to be used in the next operation. At the same time, the stream data generation circuit 143 is initialized with the current session key D12 before the update as a normal operation. At this time, the cryptographic module 134 performs a dummy operation in synchronization with the operational period of the session key generation circuit 142 and the stream data generation circuit 143.

In a data processing period (times T13 to T14), the stream data generation circuit 143 generates the stream data D13 as a normal operation, and thereby the non-encrypted data S13 is encrypted. At this time, the session key generation circuit 142 and the cryptographic module 134 perform a dummy operation in synchronization with the operational period of the stream data generation circuit 143.

In the memory device 3 according to the present modification, in a period in which the cryptographic module 133 performs a normal operation while the cryptographic module 132 does not perform a normal operation (command processing period and data processing period), the control circuit 131 causes the cryptographic modules 132 and 134 to perform a dummy operation. The power consumption characteristic of the cryptographic module 133 is effectively hidden by causing the cryptographic modules 132 and 134 to perform a dummy operation in a period in which only the cryptographic module 133 performs a normal operation.

In a period in which both of the cryptographic modules 132 and 133 perform a normal operation concurrently (latency period), the control circuit 131 causes the cryptographic module 134 to perform a dummy operation. The power consumption characteristic of the cryptographic modules 132 and 133 is further hidden effectively by causing the cryptographic module 134 to perform a dummy operation in a period in which both of the cryptographic modules 132 and 133 perform a normal operation concurrently.

The above description is an example of applying the present modification to the memory device 3, while the present modification is also applicable to the host device 2 with similar advantage.

While the invention has been described in detail, the foregoing description is in all aspects illustrative and not restrictive. It is understood that numerous other modifications and variations can be devised without departing from the scope of the invention.

What is claimed is:

1. A memory device configured to be connected to a host device, comprising:
   a first cryptographic module including circuitry and a second cryptographic module including circuitry, the first and second cryptographic modules each configured to perform a normal operation to encrypt and decrypt data to be transmitted and received between the host device and the memory device,
   a third cryptographic module including circuitry and configured to perform a dummy operation based on dummy key information, and
   a control circuit configured to control an operation of the third cryptographic module, the control circuit being configured to cause the third cryptographic module to perform a dummy operation in a period in which one of the first cryptographic module and the second cryptographic module performs a normal operation, wherein
   the first cryptographic module includes a first temporary data generation circuit configured to generate temporary data based on input data,
   the second cryptographic module includes a first encryption circuit configured to perform encryption based on the temporary data generated by the first temporary data generation circuit,
   the third cryptographic module includes a second temporary data generation circuit configured to generate temporary data based on dummy input data and a second encryption circuit configured to perform encryption based on the temporary data generated by the second temporary data generation circuit, and
   the control circuit is configured to cause the second encryption circuit to perform a dummy operation in a period in which only the first temporary data generation circuit of the first temporary data generation circuit and the first encryption circuit performs a normal operation, while causing the second temporary data generation circuit to perform a dummy operation in a period in Which only the first encryption circuit of the first temporary data generation circuit and the first encryption circuit performs a normal operation.

2. The memory device according to claim 1, wherein the control circuit is further configured to cause the first cryptographic module to perform a dummy operation in a period in which the second cryptographic module performs a normal operation while the first cryptographic module does not perform a normal operation.

3. The memory device according to claim 2, wherein the control circuit is further configured to cause the third cryptographic module to perform a dummy operation in a period in which both of the first cryptographic module and the second cryptographic module perform a normal operation concurrently.

4. The memory device according to claim 1, wherein the dummy input data has a fixed value.

5. The memory device according to claim 1, wherein the dummy input data has a variable value.

6. The memory device according to claim 1, wherein the input data is key information.

7. The memory device according to claim 1, further comprising:
   an unauthorized access detection circuit configured to detect an unauthorized access from the host device, wherein the control circuit is configured to cause the third cryptographic module to perform a dummy operation if the unauthorized access detection circuit detects the unauthorized access.

8. A host device configured to accept a memory device, comprising:
   a first cryptographic module including circuitry and a second cryptographic module including circuitry, the first and second cryptographic modules each configured to perform a normal operation to encrypt and decrypt data to be transmitted and received between the host device and the memory device,
   a third cryptographic module including circuitry and configured to perform a dummy operation based on dummy key information, and
   a control circuit configured to control an operation of the third cryptographic module, the control circuit being configured to cause the third cryptographic module to perform a dummy operation in a period in which one of the first cryptographic module and the second cryptographic module performs a normal operation, wherein
   the first cryptographic module includes a first temporary data generation circuit configured to generate temporary data based on input data,
   the second cryptographic module includes a first encryption circuit configured to perform encryption based on the temporary data generated by the first temporary data generation circuit,
   the third cryptographic module includes a second temporary data generation circuit configured to generate temporary data based on dummy input data and a second encryption circuit configured to perform encryption based on the temporary data generated by the second temporary data generation circuit, and
   the control circuit is configured to cause the second encryption circuit to perform a dummy operation in a period in which only the first temporary data generation circuit of the first temporary data generation circuit and the first encryption circuit performs a normal operation, while causing the second temporary data generation circuit to perform a dummy operation in a period in which only the first encryption circuit of the first temporary data generation circuit and the first encryption circuit performs a normal operation.

9. The host device according to claim 8, wherein the control circuit is further configured to cause the first cryptographic module to perform a dummy operation in a period in which the second cryptographic module performs a normal operation while the first cryptographic module does not perform a normal operation.

10. The host device according to claim 9, wherein the control circuit is further configured to cause the third cryptographic module to perform a dummy operation in a period in which both of the first cryptographic module and the second cryptographic module perform a normal operation concurrently.

11. The host device according to claim 8, wherein the dummy input data has a fixed value.

12. The host device according to claim 8, wherein the dummy input data has a variable value.

13. The host device according to claim 8, wherein the input data is key information.

14. A memory system comprising:
    a host device and
    a memory device configured to be connected to the host device,
    wherein the host device includes
    a first cryptographic module including circuitry and a second cryptographic module including circuitry, the first and second cryptographic modules each configured to perform a normal operation to encrypt and decrypt data to be transmitted and received between the host device and the memory device, a third cryptographic module including circuitry and configured to perform a dummy operation based on dummy key information, and a first control circuit configured to control an operation of the third cryptographic module, the first control circuit being configured to cause the third cryptographic module to perform a dummy operation in a period in which one of the first cryptographic module and the second cryptographic module performs a normal operation, and wherein the memory device includes a fourth cryptographic module including circuitry and a fifth cryptographic module including circuitry, the fourth and fifth cryptographic modules each configured to perform a normal operation to encrypt and decrypt data to be transmitted and received between the host device and the memory device, a sixth cryptographic module including circuitry and configured to perform a dummy operation based on dummy key information, and a second control circuit configured to control an operation of the sixth cryptographic module, the second control circuit being configured to cause the sixth cryptographic module to perform a dummy operation in a period in which one of the fourth cryptographic module and the fifth cryptographic module performs a normal operation.

* * * * *